United States Patent [19]

Matthews et al.

[11] 3,934,095
[45] Jan. 20, 1976

[54] METHOD AND SYSTEM FOR SHORT TERM QUEUING OF TELEPHONE CALLS IN AUTOMATIC INTER-CITY TELEPHONE CALL CONNECTION SYSTEM

[75] Inventors: Gordon H. Matthews; Barry M. Epstein, both of Dallas, Tex.

[73] Assignee: Action Communication Systems, Inc., Dallas, Tex.

[22] Filed: June 24, 1974

[21] Appl. No.: 483,061

[52] U.S. Cl.......... 179/18 D; 179/18 B; 179/18 EA; 179/18 ES
[51] Int. Cl.².................... H04Q 3/64; H04Q 3/70
[58] Field of Search ........ 179/18 D, 18 EA, 18 DA, 179/18 B, 18 BH, 18 BG, 18 ES

[56] References Cited
UNITED STATES PATENTS

| | | | |
|---|---|---|---|
| 3,492,433 | 1/1970 | Duft et al. | 179/18 BG |
| 3,553,385 | 1/1971 | Morgan et al. | 179/18 BG |
| 3,560,663 | 2/1971 | Lee et al. | 179/18 EA |
| 3,576,398 | 4/1971 | De Jean et al. | 179/18 EA |
| 3,689,703 | 9/1972 | Allen et al. | 179/18 B |
| 3,736,383 | 5/1973 | Le Baron | 179/18 HA |

*Primary Examiner*—Thomas W. Brown
*Attorney, Agent, or Firm*—Richards, Harris and Medlock

[57] ABSTRACT

The specification discloses a system for automatically controlling the connection of telephone calls between a plurality of input telephone trunk lines at a user's dedicated telephone switching facility and a preset number of output telephone trunk lines. Circuitry is provided to receive user authorization code numbers from the user's facility and for comparing the user authorization code numbers with stored code numbers or with a specified algorithymic equation. A dial tone allowing further operation of the system is provided only if the user authorization code numbers match ones of the stored code numbers or is determined valid by the equation. The system receives dialing signals from an input telephone trunk line and in response thereto selects an available one of the output telephone trunk lines according to predetermined efficiency criteria. For example, calls are completed on all flat rate trunk lines (WATS, FX, tie lines and the like) prior to completing calls on variable rate lines (DDD or the like). The system then establishes audio connections between the calling input telephone trunk line and the selected available output telephone trunk line to complete the inter-city call. If all flat rate output telephone trunk lines are busy, an audio message is presented to the caller to indicate that the system will attempt to complete the call in a predetermined time period and to request that the caller hold. If a flat rate output telephone trunk line becomes available during the predetermined time period, the call is automatically completed. If the predetermined time period runs out without the call being completed, the system determines the priority of the caller. If the caller has a low priority, an error tone is generated and the caller is disconnected. If the caller has a high priority, the call is automatically completed on a variable rate direct dial line. If the caller has a special priority authorization code number, the predetermined time period is not initiated and the call is immediately connected through a variable rate direct dial line. Prior to the system connecting the caller to a variable rate direct dial line, a warning tone is generated. The caller may then either hang up if he does not wish to use the variable rate line or stay on the line to complete his call.

17 Claims, 27 Drawing Figures

METHOD AND SYSTEM FOR SHORT TERM QUEUING OF TELEPHONE CALLS IN AUTOMATIC INTER-CITY TELEPHONE CALL CONNECTION SYSTEM

RELATED APPLICATIONS

This application is an improvement on application Ser. No. 430,501, filed Jan. 3, 1974 and entitled "METHOD AND SYSTEM FOR AUTOMATICALLY CONTROLLING THE CONNECTION OF INTER-CITY TELEPHONE CALLS AT A USERS FACILITY".

FIELD OF THE INVENTION

This invention relates to inter-city communication circuits and more particularly relates to a method and system for automatically controlling the connection of inter-city telephone calls in an economical manner at a user's facility.

THE PRIOR ART

Large businesses and organizations often utilize a variety of techniques for completing inter-city or long distance telephone calls, such as leased lines to various telephone area zones, direct distance dialing, foreign exchange, tie lines and the like. For large companies or organizations having heavy long distance traffic, company-paid operators are often required at the user's facility in order to place the long distance calls. Not only are such company-paid operators expensive, but the operators are not always able to place long distance calls on the most economical available lines and are subject to human error resulting in misconnections, erroneous billings and the like. Further, with such company-paid operator systems, increases in the size of the system means proliferation of human operators, thereby resulting in a complex system with increasing costs and rising inefficiency. Prior operator controlled systems are also subject to unauthorized calls being made and charged to the company's expense. Such prior systems have also often relied upon handwritten data from the operators to provide data about the use of the long distance facility, and it has thus been difficult to efficiently provide detailed data regarding the system which would enable proper allocation of service calls to various departments, cost centers and the like.

The co-pending U.S. patent application Ser. No. 430,501 describes a system for automatically controlling the connection of inter-city telephone calls in an efficient manner at the user's facility. However, a need has arisen for such an automatic control system to provide greater efficiency in the handling of calls made when all available output circuits are in use.

SUMMARY OF THE INVENTION

The present invention substantially reduces or minimizes problems heretofore associated with long distange telephone systems requiring company-paid telephone operators at the user's facility. In accordance with the present invention, the most economical method of placing each long distance call is accurately selected. If the most economical line is unavailable, the next least expensive line is then utilized for the call. With the use of user authorization codes, only authorized persons are allowed to place long distance calls through the present system. Accurate accounting and analysis data is automatically recorded for each call and may be utilized for charge-back purposes to enable the system to be optimumly utilized. If all output circuits are busy at the time of a call request, the system will ask the caller to hold for a short period so that the call may be completed. If the call cannot be completed during the short period, and the caller has a proper authorization code, the call is spilled over to a direct dial line. The system constantly monitors all the telephone circuits for proper connect, disconnect and for malfunction of the system and for apparent malfunctions of the telephone trunks.

In accordance with a more specific aspect of the invention, a system is provided for automatically controlling the connection of inter-city communication circuits between a plurality of input lines at a user's facility and a plurality of output trunk lines extending to a central office. The system includes circuitry for receiving dialing signals from the input line and circuitry responsive to the dialing signal for selecting available ones of the output trunk lines according to predetermined efficiency criteria. Audio connections are then established between the calling input lines and the selected available output trunk lines. When no output lines are available, the caller is requested to hold for a predetermined interval, during which the call is automatically completed if an output line becomes available.

In accordance with another aspect of the invention, a system is provided for automatically controlling the connection of inter-city telephone calls between a central office and a user's facility having a plurality of user terminals. Circuitry receives user authorization code numbers from the user terminals. Circuitry in the system compares the authorization code numbers with stored code numbers and generates a dial tone to authorize a user terminal only if the authorization code numbers match ones of the stored code numbers. Dialing signals are then received from the authorized user terminal and the system connects the authorized user terminal with a selected flat rate output telephone line to the central office for completion of the dialed inter-city telephone calls. If no flat rate output lines are available, an audio message is generated to request the caller to hold for a predetermined time interval during which the call is automatically connected if a flat rate output telephone line becomes available. Circuitry is responsive to predetermined ones of the user authorization codes for immediately connecting the caller with a variable rate output telephone line if no flat rate output telephone lines are available.

DESCRIPTION OF THE DRAWINGS

For a more complete understanding of the present invention and for further objects and advantages thereof, reference is now made to the following description taken in conjunction with the accompanying Drawings, in which.

DESCRIPTION OF THE PREFERRED EMBODIMENT

Figure 1:
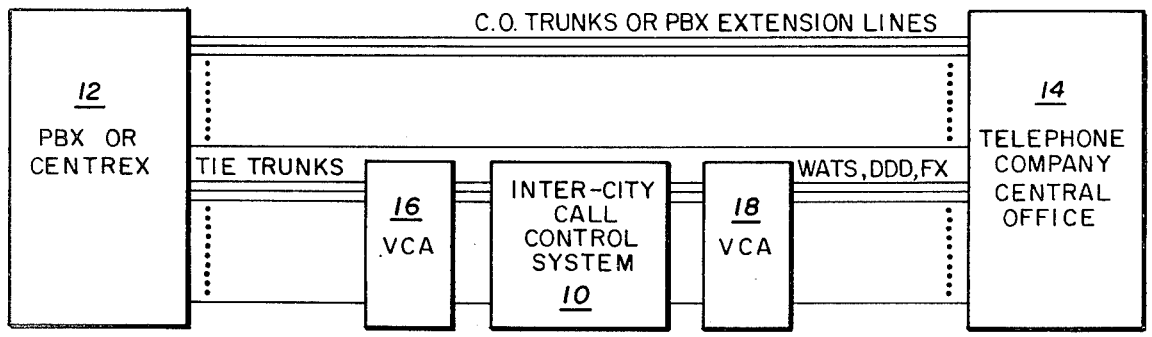
FIG. 1 is a block diagram illustrating the connection of the present inter-city call control system between the user's facility and the telephone company central office.

FIG. 1 illustrates a block diagram of the interconnection of the present inter-city call control system 10 between a user's dedicated telephone switching facility 12 and a telephone central office 14. The user's facility 12 may comprise a private branch exchange (PBX), a Centrex system or the like. As illustrated, a voice connecting arrangement (VCA) 16 is connected to input telephone lines, such as tie trunks, which extend from the user's facility 12. The output of the VCA 16 is connected to the input of the present inter-city call control system 10. The output of the call control system 10 is applied through a VCA 18 and through output telephone trunk lines to the telephone company's central office 14. The output telephone trunk lines may comprise leased flat rate WATS lines, variable rate direct distance dialing (DDD) lines, foreign exchange (FX) lines, tie-lines and the like, or any combination of such lines. In a typical installation, VCA 18 will be connected to a plurality of WATS lines leading to different WATS toll areas. Thus certain of the output telephone trunk lines will be more expensive to use than others.

As will be subsequently described in detail, the inter-city call control system 10 operates to select the most economical available output telephone trunk lines for connecting each particular call, thereby preventing the more expensive output telephone trunk lines from being tied up with short distance calls which may be more economically handled by less expensive output trunk lines. After the most economical trunk is selected for routing the calls, if the trunk is busy, the system proceeds to the next highest output telephone trunk line available to the caller. In addition, the system 10 allows only authorized persons to place long distance calls by the use of user authorization code numbers.

The authorization code numbers can permit authorization based on priority, distance, time (such as specification of certain hours), and the type facility such as WATS lines, DDD, foreign exchange, tielines or the like.

The system also allows for very efficient use of the flat rate output telephone lines by transmitting an audio message to a caller when all of the flat rate lines are in use and are thus not immediately available. The audio message informs the caller that at the present all lines are busy, but the audio message requests the caller to hold the line for a predetermined short time interval, such as thirty seconds. The caller then holds until the time interval expires, or until the caller hangs up, or until the call is completed. If the time interval expires without the call being completed on one of the flat rate lines, the call is automatically switched to a variable rate line and a conventional direct dial call is placed if the caller has a predetermined high priority user authorization code number. If the caller has a low priority user authorization code number, an error tone is generated and the call is terminated. However, if the system detects a special high priority user authorization code number, the time interval is not initiated if all flat rate output lines are unavailable, but the call is immediately connected to a variable rate line so that a direct dial call may be placed without delay. However, prior to the completion of a variable rate direct dial call, a short warning code is generated. The caller may then hang up if he does not wish to make a variable rate call, or may hang on the line to complete his call.

The call control system 10 further provides accounting and analysis of inter-city calls made through the system. This accounting feature permits allocation of the cost of calls to various departments or individuals as desired. At the completion of each inter-city call, system 10 thus records data on magnetic recording medium to provide a record of the authorization number, the inter-city number called, the duration of the call, the time of day the call was placed, the long distance trunk desired and the long distance trunk used. The information recording the long distance trunks desired and used is available in analyzing whether or not a call was made through the least expensive route or whether a higher class trunk was utilized. System 10 also records the system usage information for real time analysis to provide the number of calls and usage time data for immediate review.

The inter-city call control system 10 also provides automatic call back features, wherein if all output telephone trunk lines are busy at the time of a call, system 10 will give the caller with the option to enter the long term call queue stored by system 10. If the caller enters the queue, system 10 will enter his request in the queue at the proper point based upon the caller's priority and the caller hangs up. The system 10 will then ring and notify the caller when the desired circuit is ready.

The call control system 10 also allows the use of speed numbers, wherein long distance calls to frequently used numbers may be made by replacing the telephone company standard ten digit code with a two or three digit speed code. These frequently used speed numbers are stored in the memory of the call control system 10. If desired, individuals may be assigned personal speed numbers and may also have access to universally used speed numbers.

The call control system 10 also constantly monitors all circuits for proper connect/disconnect, excessive busy time, inactivity for long periods, excessive short calls and other conditions, and detects apparent malfunctions from adjoining telephone trunks.

Figure 2:
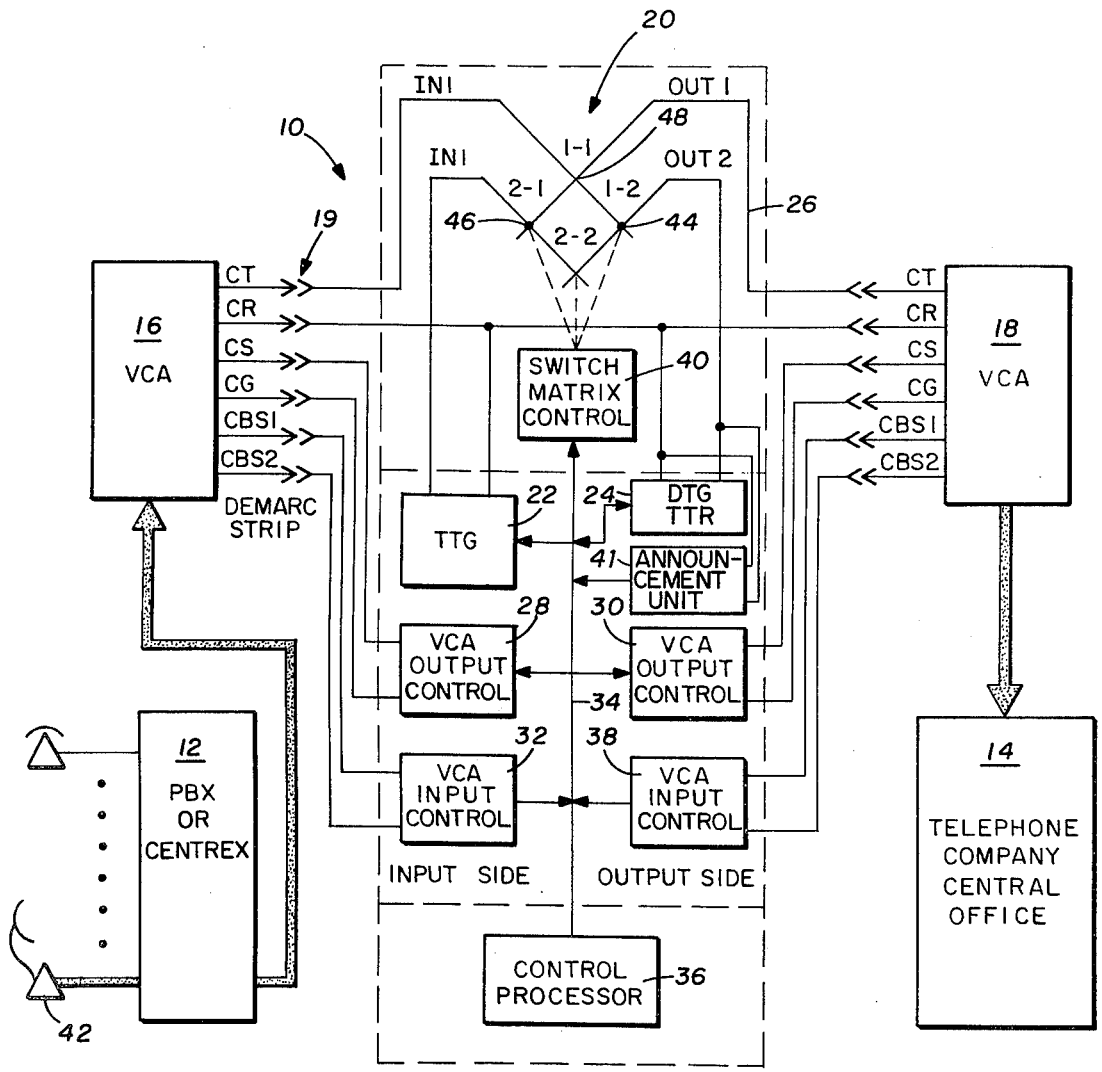
FIG. 2 is a somewhat diagrammatic block diagram of the present inter-city call control system.

FIG. 2 illustrates a more detailed diagram of the interconnection of the system 10, wherein like numbers are utilized for like and corresponding parts previously identified. As noted, the output tie trunks extending from the PBX or Centrex 12 are connected through a voice connecting arrangement (VCA) 16. In the preferred embodiment, the VCA 16 may comprise a CDQ2W voice connecting arrangement presently manufactured by the Bell Telephone System. The CDQ2W VCA includes output terminals connected to system 10 at a demarc strip 19, the terminals being identified by Bell Telephone identification numbers as follows: CT, CR, CS, CG, CBS1 and CBS2. Terminals CT and CR are connected to a limiter (not shown) found in the voice coupler unit of the VCA 16. Terminals CS-CBS2 are connected to outputs from a signal oscillation unit (not shown) in the VCA 16. The VCA 16 is duplex in that signals may be sent simultaneously in both directions without interference.

The CT terminal of VCA 16 is connected to a first input (IN1) terminal of a switching matrix 20 located within the inter-city call control system 10 of the invention. Switch matrix 20 in the preferred embodiment comprises a complex series of 8 × 8 switch matrixes, but in the present example a simplified one input-one output matrix is shown for clarity of illustration. A "Touchtone" or dial tones signal generator (TTG) 22 is connected at one terminal to the CR terminal at the demarc strip 19, with the other terminal of generator 22 connected to the second input (IN2) terminal of the switch matrix 20.

The CR terminal of the VCA 16 is also connected to a dial or progress tone generator (DTG) and a "Touchtone" receiver (TTR) 24. The other terminal of the generator and receiver 24 is connected to the second output (OUT2) of the switch matrix 20. The first output (OUT1) of the switch matrix 20 is connected via lead 26 to the CT terminal of the voice connecting arrangement (VCA) 18, which in the preferred embodiment may comprise the CDH VCA manufactured and sold by the Bell Telephone System. The CS and CG terminals of the VCA 16 are connected to a VCA output control circuit 28. A VCA output control 30 is connected to the CS and CG terminals of the VCA 18.

The CBS1 and CBS2 outputs from the VCA 16 are connected to a VCA input control 32 which is connected to a high speed data bus 34 extending to a central processor 36. The TTG 22 and DTG-TTR 24 are also connected to the high speed bus 34. A VCA input control 38 is also connected between the bus 34 and the CBS2 terminal of the VCA 18. The VCA output control 28 and VCA input control 32 constitute the input side of the present system, while the VCA output control 30 and VCA input control 38 constitute the output side of the present system. A switch matrix control 40 is controlled through the data bus 34 by the central processor 36 in order to control the interconnections made at the switch matrix 20.

An announcement unit 41 is also connected to the data bus 34 and to the switch matrix 20. As will be subsequently described, unit 41 comprises an intercept recorder/announcer such as the Audichron Model J21201(HQ1) multichannel Recorder/Announcer manufactured and sold by the Audichron Company of Atlanta, Georgia. Unit 41 contains an audible message for playback during the short term queuing operation of the system. In place of unit 41, it will be understood that a voice response unit may be used.

In initial description of the operation of the system shown in FIG. 2, it will be assumed that the single output trunk line which extends to the telephone company central office 14 is available.

To place a long distance call at the user's facility 12, a user takes the hand set of a telephone terminal 42 connected to the PBX 12 off-hook. The PBX 12 detects the off-hook condition of the terminal 42 and returns a conventional dial tone to the user through the hand set. In this example and in subsequent examples, the telephone terminals 42 may comprise either rotary dial or touchtone dial terminals. The user then dials the system access code which may be for instance a 2-digit number such as "99". In response thereto, the PBX 12 routes the phone terminal 42 through the system input line to the VCA 16. The VCA 16 detects the service request from the PBX 12 and provides the system with a contact closure between terminals CBS1 and CBS2. The VCA input control 32 detects the contact closure and converts the closure to readable form for the central processor 36. The central processor 36, which continually monitors for a request signal, detects the service request from the VCA input control 32 and initiates a service sequence.

The service sequence includes the operation of matrix control 40 to close switch matrix cross point 1–2, identified as point 44 in FIG. 2, which thereby connects the dial or progress tone generator (DTG) and Touchtone receiver (TTR) 24 across the tip and ring of the VCA 16 (terminals CT and CR). The central processor 36 then operates the dial tone generator 24 to apply a dial progress tone or dial progress information through the point 44 in the matrix 20 and through the IN1 lead to the CT or CR terminals of the VCA 16. The dial progress tone may comprise a steady dial tone or a short signal frequency tone. Alternatively, dial progress information may be transmitted from a voice "answerback" unit. This progress tone or information is applied through the PBX 12 to the telephone terminal 42 and the user. The central processor 36 then monitors the TTR 24 for dial information received from the telephone terminal 42.

If the telephone terminal 42 is a touchtone device, touchtone dial information is applied from the terminal 42 through the PBX 12, through the VCA 16 and through the matrix 20 to the TTR 24. If the telephone terminal 42 is a rotary dial, the dial information input by the user is directed through the PBX 12 and the VCA 16 through the request leads CBS1 and CBS2 to the VCA input control 32.

After the user detects the dial progress tone applied from the DTG 24, the user dials his authorization code into the telephone terminal 42. This authorization code is unique for each user and may comprise for example a unique 4-digit code. The central processor 36 detects the authorization code from either the TTR 24 or the VCA input control 32 and performs code verification. Code verification includes comparing the input user authorization code against a stored table of valid authorization codes. If the input user's authorization code is found in the stored table, authorization to the system is permitted and the central processor 36 operates the DTG 24 to apply a second dial progress tone through the point 44 in the matrix 20 to lead IN1. The progress tone is then applied to terminal CT and through the VCA 16 and PBX 12 to the telephone terminal 42. If the central processor 36 determines that the input authorization code is not valid, the central processor 36 operates the DTG to generate a busy signal and the central processor 36 operates the switch matrix control 40 to terminate the connection at point 44 to drop the call.

Instead of using a stored table of user authorization codes, an algorithmic check system may be utilized. In this system, each code includes a self checking number. For example in the code number 2349, the number 9 is the self checking number. For the code to be correct, the first three digits must add up to the self checking number. The computer thus adds the first three digits and compares the sum to the self checking number.

The user detects the second dial progress tone at the telephone terminal 42 and proceeds to dial the desired telephone number. In practice, the user may for example dial 1 plus a 3-digit area code plus a 7-digit telephone number. This dialing information is applied through the PBX 12 and the VCA 16 to the Touchtone receiver (TTR) 24. TTR 24 converts the tone into digital signals for application to the bus 34 and to the central processor 36. If the telephone terminal 42 is a rotary dial, the dialing information is applied through the VCA input control 32 to the central processor 36.

Upon receipt by the central processor 36 of the 3-digit area code, the central processor 36 selects the most economical output trunk line according to predetermined criteria. Generally, the central processor 36 will select the output trunk line to place a call upon by matching the area code with a stored table representing the area codes serviced by various ones of the output trunk lines. The central processor 36 will select the least expensive output trunk line servicing the area code and will check to determine that the selected output trunk line is available. If the selected output trunk line is not available, the central processor 36 will select the next least expensive output trunk for connection and so on. For example, a system will often have a plurality of different output trunk lines extending to different areas of the country, with the line extending to the longer distances being the most expensive. The present system selects the least expensive available output trunk line extending to the dialed area zone.

After selecting the most economical available output trunk line, the central processor 36 initiates central office service by activating the VCA 18 through the VCA output control 30. This provides a contact closure between terminals CS and CG to the VCA 18. This contact closure is detected by the telephone central office 14 and central office service is provided on the selected output trunk line. The provided central office service is detected by the VCA 18 which then provides contact closure between terminals CBS1 and CBS2. The VCA input control 38 senses the contact closure and directs this information through the bus 34 to the central processor 36. The central processor 36 detects the central office service and operates the switch matrix control 40 in order to initiate closure of the matrix cross point 2-1 identified as point 46. Contact closure of point 46 connects the TTG 22 through the terminal OUT1 of the matrix 20 to the VCA 18. The central processor 36 then operates the TTG 22 in order to repeat the dial information supplied previously by the user through the VCA 18 to the central office.

Upon completion of transmitting the representation of the dialing of the 7-digit number, the central processor 36 operates the switch matrix control 40 in order to disconnect the DTG-TTR 24 and the TTG 22 by releasing the relay cross point 1-2 and cross point 2-1. The central processor 36 then completes the final call processing by connecting the tip and ring of VCA 16 to the tip and ring of VCA 18 by operating the switch matrix control 40 to close the matrix relay cross point 1-1 identified as point 48. This directly connects the user through the telephone terminal 42, through the VCAs 16 and 18 to the central office 14 in order to connect up the desired call. The central processor 36 continues to monitor the connection at the matrix point 48 until an on-hook from either party is detected. The switch matrix control 40 is then operated in order to disconnect point 48 to properly terminate the call.

If all of the flat rate output trunk lines are unavailable when the dialing signals are received by the central processor 36, the announcement unit 41 is operated by the processor 36 to play back a recorded message through the point 44 in the matrix 20 to the VCA 16 and to the caller. In accordance with the short term queuing operation of the system, the message audibly tells the caller that all lines are presently busy and requests the caller to remain on the line for a predetermined brief interval such as 30 seconds. If a flat rate output line becomes available during the hold interval, the central processor 36 initiates central office service through the available output line and completes the call in the manner previously described. If the hold interval expires without a flat rate output line becoming available, and the user authorization code has the required high priority, the central processor 36 picks an available variable rate DDD line and completes the call in the manner previously described. If the caller has a low user authorization code, the call is terminated and no call is placed on the variable rate lines. If the hold interval ends and no flat rate nor variable rate output lines are available, a busy signal is transmitted to the caller to signal the caller to try again later.

If the central processor 36 detects a special high priority user authorization code, and no flat rate output lines are available, the hold interval is not initiated. Rather, the call is immediately completed on a variable rate direct dial line.

In any case, prior to completing a call on a variable rate line, a warning signal is generated so that the caller may hang up prior to the completion of the variable rate call.

Figure 3:
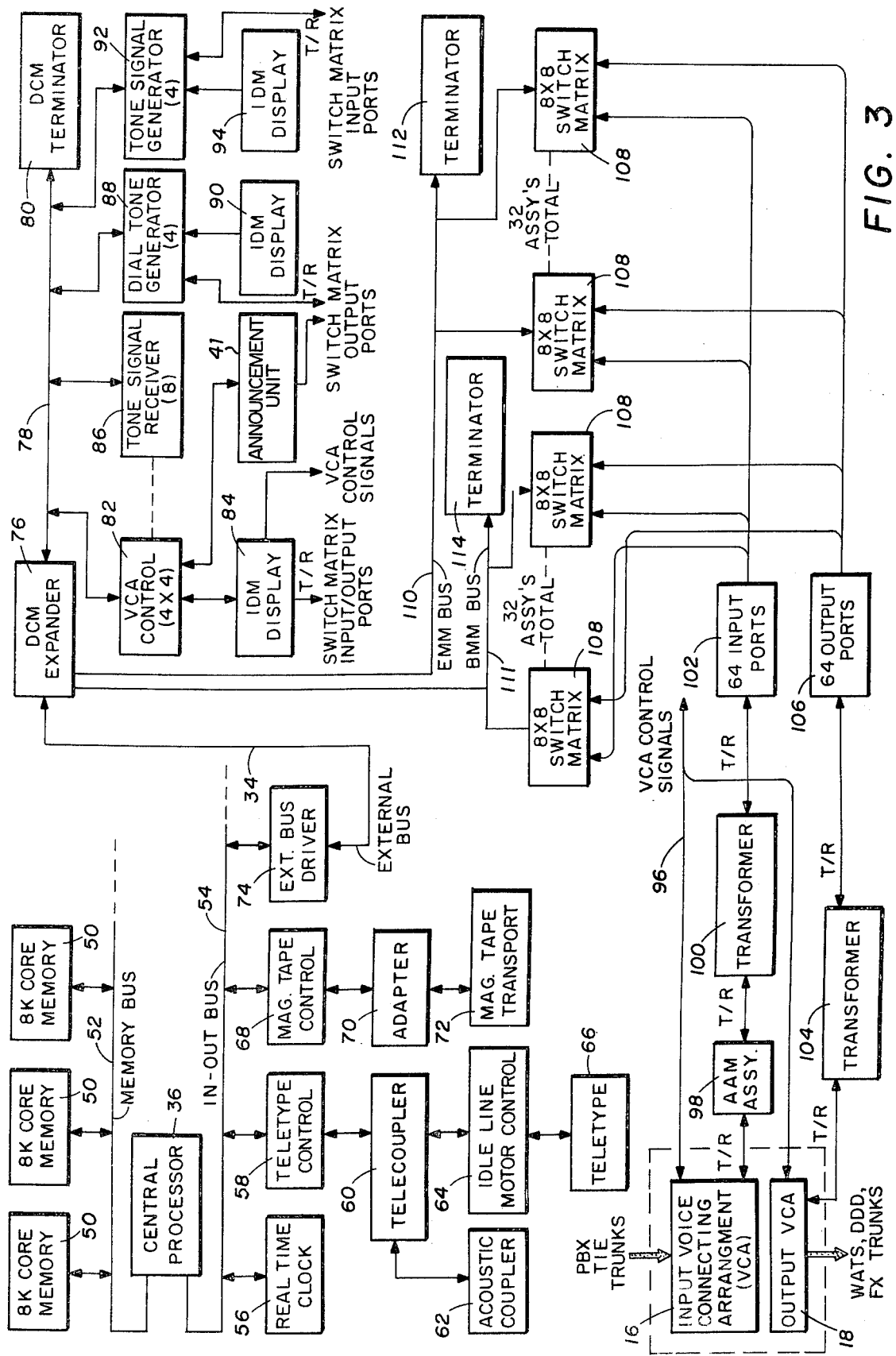
FIG. 3 is a detailed block diagram of the present inter-city telephone call control system illustrating the announcement unit circuitry used in the present short term queuing invention.

FIG. 3 illustrates the present system in greater detail, with like numbers being utilized for like and corresponding parts previously described. The central processor 36 may comprise any suitable automatic data processing machine. In the preferred embodiment, the central processor 36 comprises a properly programmed digital computer of the mini-computer class such as the Nova 1200 CPU manufactured and sold by Data General Corporation. A plurality of core memories 50 are connected to a memory bus 52 extending from the central processor 36 in order to provide any desired amount of core memory for storage and instruction of the central processor.

An in-out bus 54 extends from the central processor 36 and a real time clock 56 is connected thereto, in order to generate timing pulses independent of processor timing. The real time clock 56 also provides the time-of-day for dating system messages and lists. A Teletype control 58 is connected to the in-output bus 54 to provide control between the bus and a telecoupler system 60. An acoustic coupler 62 is connected to the telecoupler system 60 in order to enable remote diagnosis and monitoring of the present system from a remote office. For a more detailed description of the construction and operation of the telecoupler system, reference is made to the co-pending U.S. patent application Ser. No. 293,774, filed Oct. 2, 1972, now U.S. Pat. No. 3,889,862, entitled "System and Method for Coupling Remote Data Terminals Via Telephone Lines".

An idle line motor control 64 is connected between the telecoupler 60 and a Teletype 66. The idle line motor control 64 is utilized to turn on the Teletype 66 prior to message print out by the Teletype 66. The Teletype 66 may comprise any suitable Teletype such as the well known ASR 33 Teletype. The Teletype 66 serves as the control console for the central processor 36 and is utilized for requesting message print outs and for making user authorization number and trunk additions and deletions.

A magnetic tape control 68 is connected to the bus 54 and operates through an adapter 70 to control a magnetic tape transport 72. The magnetic tape transport 72 may comprise for example a 7 to 9 track tape transport having 800 BPI density in order to log all the long distance billing information for attempted calls. A suitable magnetic tape transport for use with the system is manufactured and sold by the Wang Corporation.

An external bus driver 74 is connected to the in-out bus 54 and operates to drive the high speed external data bus 34 which extends to the device control module (DCM) expander circuit 76. Bus driver 74 decodes device address signals and routes control signals to the device control module (DCM) via the external bus 34. Data input signals, DI00 through DI15, are amplified by the driver 74 and routed to the central processor 36 via bus 54. Data signals DO00 through DO15 are amplified by driver 74 and routed to the DCM via bus 34. The expander circuit 76 operates in conjunction with the external bus driver 74 in order to provide decoding or buffering. A DCM bus 78 extends from the DCM expander circuit 76 to a DCM terminator circuit 80. Terminator circuit provides terminating resistance for the data bus signals and provides BCD decoding. A VCA control circuit 82 includes the VCA output and input control circuits 28, 30, 32 and 38 previously described in FIG. 2. The VCA control circuit 82 processes device address signals from the expander 76. The outputs from the VCA control circuit 82 are device status signals SELB, SELD and data input signals DI09 and DI10. The VCA control circuit 82 is connected to an interface/display module (IDM) display circuit 84 which receives control signals CSH and CSQ to provide relay closure. Circuit 84 also provides control points for all signal cabling which includes a light emitting diode display to illustrate the activity of the input and output VCAs and other servicing devices. The IDM display 84 thus receives switch matrix input/output port signals and VCA control signals.

The announcement unit 41 is connected to the VCA control 82 and also to the switch matrix outputs. As previously noted, the announcement unit 41 may comprise any suitable source of prerecorded audio messages such as the Audichron Model J21201(HQ1). The unit 41 is interconnected with the VCA in the manner shown in detail in FIG. 27.

Eight tone signal receivers 86 are connected along the bus 78 and operate in conjunction with up to four dial tone generators 88. Receivers 86 and generators 88 correspond to the DTG-TTR circuit 24 shown in FIG. 2. The output from each receiver 86 is multiplexed and applied to terminator 80. Device group address signals (DGA) are used to select the correct multiplexed output from each receiver. An IDM display 90 is connected to the dial tone generator 88. The switch matrix output ports to be subsequently described are applied to the dial tone generator 88 in a similar manner as shown in FIG. 2. Up to four tone signal generators 92 are connected along bus 78 and include an IDM display 94 connected thereto. The tone signal generator 92 corresponds to the TTG 22 previously shown in FIG. 2. The tone signal generator 92 is coupled to the switch matrix input port in a similar manner as that shown in FIG. 2.

The dial tone generator 88 uses signals 0012 through 0015 from a base generator circuit, to be subsequently described, to select one of four time signals, CLK, CROSC1, or CROSC2. The signals selected closes a relay to provide one of two 440 Hz oscillator signals, OSC1 or OSC2 from the DCM terminator circuit 80. The selected oscillator signal is applied to the signal generator base output transofrmers, to be subsequently described. Signals DISA and DISB are transformers, to the IDM 84 to indicate which time signal was selected. Signals MF1 and MF2 are generated by the DCM terminator 80 and used by the dial tone generator 88 to detect which oscillator is in use, OSC1 or OSC2. Signals H1 through H4 and L1 through L4 from tone signal receiver 86 are decoded to provide DPR, SELB and DI11 through DI15 which are applied to the central processor 36 via the bidirectional bus line 34.

The PBX tie trunks previously shown in FIG. 1 are applied to the input voice connecting arrangement (VCA) 16 in the manner shown in FIGS. 1 and 2. Further, the wide area telephone service (WATS) lines, direct distance dialing telephone (DDD) lines, foreign exchange (FX) trunks and the like are connected to the output VCA 18 as previously described. VCA control signals are applied from the VCAs 16 and 18 to the VCA control 82 via leads 96. The tip and ring of the VCA 16 is applied through an audio amplifier module (AAM) 98 through a transformer 100 to input ports 102. Similarly, the output VCA 18 is applied through a transformer 104 to output ports 106. The 64 input ports 102 and 64 output ports 106 are applied to 64 8 × 8 switch matrixes 108. An expander matrix module (EMM) bus 110 extends from the DCM expander circuit 76 to 32 of the switch matrixes 108 and to a terminator circuit 112. A basic matrix module (BMM) bus 111 extends from the DCM expander circuit 76 to thirty two of the switch matrixes 108 and to a terminator circuit 114.

Operation of FIG. 3 is identical to the circuitry shown in FIG. 2. The dialing information from the PBX is transmitted through VCA 16 to the VCA control circuit 82 and to the 64 input ports 102 to the switch matrix. Similarly, the output VCA 18 is connected to VCA control circuit 82 and to the 64 output ports 106. The central processor 36 operates through the external data bus 34 to communicate with the VCA control 82 and to control the interconnections of the switch matrix in the manner previously described in order to initially sense a service request from VCA 16, to interconnect the dial tone generator 88 through the switch matrix to the VCA 16, to subsequently connect the tone signal receiver 86 through the switch matrix to the VCA 16 for reception of dial tone signals, to subsequently connect the tone signal generator 92 through the switch matrix to the VCA 18 in order to provide representations of the dialing signals to the central office over a selected output trunk, and to subsequently disconnect the tone signal receiver 86, the dial tone generator 88 and the tone signal generator 92 from the VCAs and to directly connect the VCA 16 to the VCA 18 through the switch matrix in order to complete the desired call.

In case all available flat rate output lines are unavailable, the processor 36 actuates the announcement unit 41 through the VCA control 82 and the prerecorded message is played back through the switch matrix and through the input VCA 16 to the caller. The call is then automatically placed if a flat rate line becomes available during the predetermined time interval. If the time period expires without a flat rate line becoming available, then the call is automatically placed on an available variable rate DDD line, if the caller has a specified high priority user authorization code number stored in the computer. If the caller has a low priority user authorization code number, no call is completed through the variable rate lines and the call is automatically terminated. If no flat or variable rate lines are available after the expiration of the time period, a busy signal is transmitted to the caller. As previously noted, the holding time period may be overriden by a special high priority authorization user code. The operation and construction of the various components of the system will now be described in schematic detail.

DEFINITION OF SIGNALS

Prior to a specific description of the present system, the following signal definitions will assist in understanding the operation of the system:

| SIGNAL | DEFINITION |
|---|---|
| DO00 through DO15 | Data Output 00 through 15 are applied from the central processor 36 to the DCM assembly. DO00 through DO15 are equal to central processor I/O bus signals DATA0 through DATA15 buffers. The present system utilizes only DO00 and DO08 through DO15 (9 bits). |
| DI00 through DI15 | Data Input 00 through 15 are applied from the DCM assembly to the central processor 36. These data signals originate at the DCM, are received and buffered by the bus driver 74 to become central processor I/O bus signals DATA0 through DATA15 respectively. The system utilizes only DI08 through DI15 (8 bits). |
| DOA, DOB, DOC, DIA, DIB, DIC, IORST, IOPLS, STRT, CLR | These signals are subsequently described in detail and are respectively central processor I/O bus signals DATOA, DATOB DATOC, DATIA, DATIB, DATIC, IORST, IOPLS STRT and CLR which are inverted, buffered and delivered to the DCM assembly. A few of the inverted signals are also used in the bus driver 74. |
| SELBE, SELDE | These two signals originate at the DCM, are received and buffered by the bus driver 74 to become the central processor I/O bus signals SELB and SELD respectively. |
| MS54 through MS57 | Matrix Select 54 through 57. These signals are decoded device address signals. 54 through 57 represents the decoded octal address as determined by the central processor I/O bus signals DSO through DS5. Signals originated at the bus driver 74 are sent to the DCM. |
| DS64 through DS67 | Device Control Select 64 through 67. These signals are decoded device address signals. 64 through 67 represents the decoded octal address as determined by the central processor I/O bus signals DSO |

| SIGNAL | -continued DEFINITION |
|---|---|
| | through DS5. Signals originate at bus driver 74 and are sent to DCM. |
| DAD0 through DAD8 | Device Address Register 0 through 8. These signals provide expanded addressing bits to the DCM. The DAD register consists of 9 latches which provide memory of data output bits DO00 through DO15. The register outputs are buffered and sent to DCM. |
| S8A through S15A | System Status bits 8A through 15A. These signals are system status input signals to the central processor. Suffix A designates that the CPU samples these status bits by using DATIA command along with special device code 76 octal. |
| S8B through S15B | System Status bits 8B through 15B. These signals are additional system status input signals to the central processor. Suffix B designates that the CPU samples these status bits by using DATIB command along with special device code 76 octal. |
| HELPI, HELPZ | This pair of signals provides a relay contact closure from the special "program cycle" monitoring circuit located on the bus driver 74. |
| DGA00 through DGA70 | Device Control Group Address 00 through 70. DCM expander 76 decodes signals DAD6, DAD7 and DAD8 along with select signal DS64 to produce 8 unique device group address signals. |
| GAI00 through GAI70 | Group (card) Address Input 00 through 70 (8). |
| BDO13, BDO14, BDO15 | Buffered Data Output 13, 14, 15. |
| GAO00 through GAO70 | Group (card) Address Output 00 through 70 (8). |
| DOB | Data Output Command B. |
| DOCMS | DOC·MS54 (Special Display Command) |
| DATOA | Data Out A. Generated by the processor after AC has been placed on the data lines in a DOA to load the data into the A buffer in the device selected by DSO-5. |
| DATIA | Data In A. Generated by the processor during a DIA to place the A buffer in the device selected by DSO-5 on the data lines. |
| DATOB | Data Out B. Equivalent to DATOA but loads the B buffer. |
| DATIB | Data In B. Equivalent to DATIA but places the B buffer on the data lines. |
| DATOC | Data Out C. Equivalent to DATOA but loads the C buffer. |
| DATIC | Data In C. Equivalent to DATIA but places the C buffer on the data lines. |
| STRT | Start. Generated by the processor in any nonskip IO instruction with an S control function (bits 8–9 = 01) to clear Done, set Busy, and clear the INT REQ flipflop in the device selected by DSO-5. |
| CLR | Clear. Generated by the processor in any nonskip IO instruction with a C control function (bits 8–9 = 10) to clear Busy, Done and the INT REQ flipflop in the device selected by DSO-5. |
| IOPLS | IO Pulse. Generated by the processor in any nonskil IO instruction with a P control function (bits 8–9 = 11) to perform some special function in the device selected by DSO-5. |
| SELB | Selected Busy. Generated by the device selected by DSO-5 if its Busy flag is set. |
| SELD | Selected Done. Generated by the device selected by DSO-5 if its Done flag is set. |
| RQENB | Request Enable. Generated at the beginning of every memory cycle to allow all devices on the bus to request program interrupts or data channel access. In any device REQENB sets the INT REQ flipflop if Done is set and Interrupt Disable is clear. Otherwise it clears INT REQ. If any device connected to the data channel RQENB sets the DCH REQ flipflop if the DCH sync flipflop is set. Other-it clears DCH REQ. |
| INTR | Interrupt Request. Generated by any device when its INT REQ flipflop is set. This informs the processor that the device is waiting for an interrupt to start. |
| INTP | Interrupt Priority. Generated by the processor for transmission serially to the devices on the bus. If the INT REQ flipflop in a device is clear when the device receives INTP, the signal is transmitted to the next device. |

| SIGNAL | -continued<br>DEFINITION |
|---|---|
| INTA | Interrupt Acknowledge. Generated by the processor during the INTA instruction. If a device receives INTA while it is also receiving INTP and its INT REQ flipflop is set, it places its device code on data lines 10–15. |
| MSKO | Mask Out. Generated by the processor during the MSKO instruction after AC has been placed on the data lines to set up the Interrupt Disable flags in all devices according to the mask on the lines. |
| DCHR | Data Channel Request. Generated by any device when its DCH REQ flipflop is set. This informs the processor that the device is waiting for data channel access. |
| DCHP | Data Channel Priority. Generated by the processor and transmitted serially to the devices on the bus. If the DCH REQ flipflop in a device is clear when the device receives DCHP, the signal is transmitted to the next device. |
| DCHA | Data Channel Acknowledge. Generated by the processor at the beginning of a data channel cycle. If a device receives DCHA while it is also receiving DCHP and its DCH REQ flipflop is set, it places the memory address to be used for data channel access on data lines 1–15 and sets its DCH SEL flipflop. |
| DCHMO, DCHMI | Data Channel Modes. Generated by a device when its DCH SEL flipflop is set to inform the processor of the type of data channel cycle desired as follows:<br>DCHM0  DCHM1<br>0 (H)   0 (H) Data Out<br>0 (H)   1 (L) Increment Memory<br>1 (L)   0 (H) Data In<br>1 (L)   1 (L) Add to Memory<br>In addition to performing the necessary functions internally, the processor generates DCH1 and/or DCH0 for the required in-out transfers. |
| DCHI | Data Channel In. Generated by the processor for data channel input (DCHMO=1) to place the data register of the device selected by DCHA on the data lines. |
| DCHO | Data Channel Out. Generated by the processor for data channel output (DCHMO-1  10) after the word from memory or the arithmetic result has been placed on the data lines to load the contents of the lines into the data register of the device selected by DCHA. |
| OVFLO | Overflow. Generated by the processor during a data channel cycle that increments memory or adds to memory (DCHM1=1) when the result exceeds $2^{16} - 1$. |
| IORST | IO Reset. Generated by the processor in the IORST instruction or when the console reset switch is pressed to clear the control flipflops in all interfaces connected to the bus. This signal is also generated during power turnon. |

THE EXTERNAL BUS DRIVER

FIGS. 4–7 illustrate in schematic detail the external bus driver 74 shown in block diagram form in FIG. 3. The external bus driver is utilized as a buffer/driver and decoder. Inputs from the central processor 36 and outputs to the DCM expander 76 are made via the bi-directional I/O bus 54 and the external bus line 34. The I/O bus 54 provides 16 data channels, nine of which are used by the present system.

Figure 4:
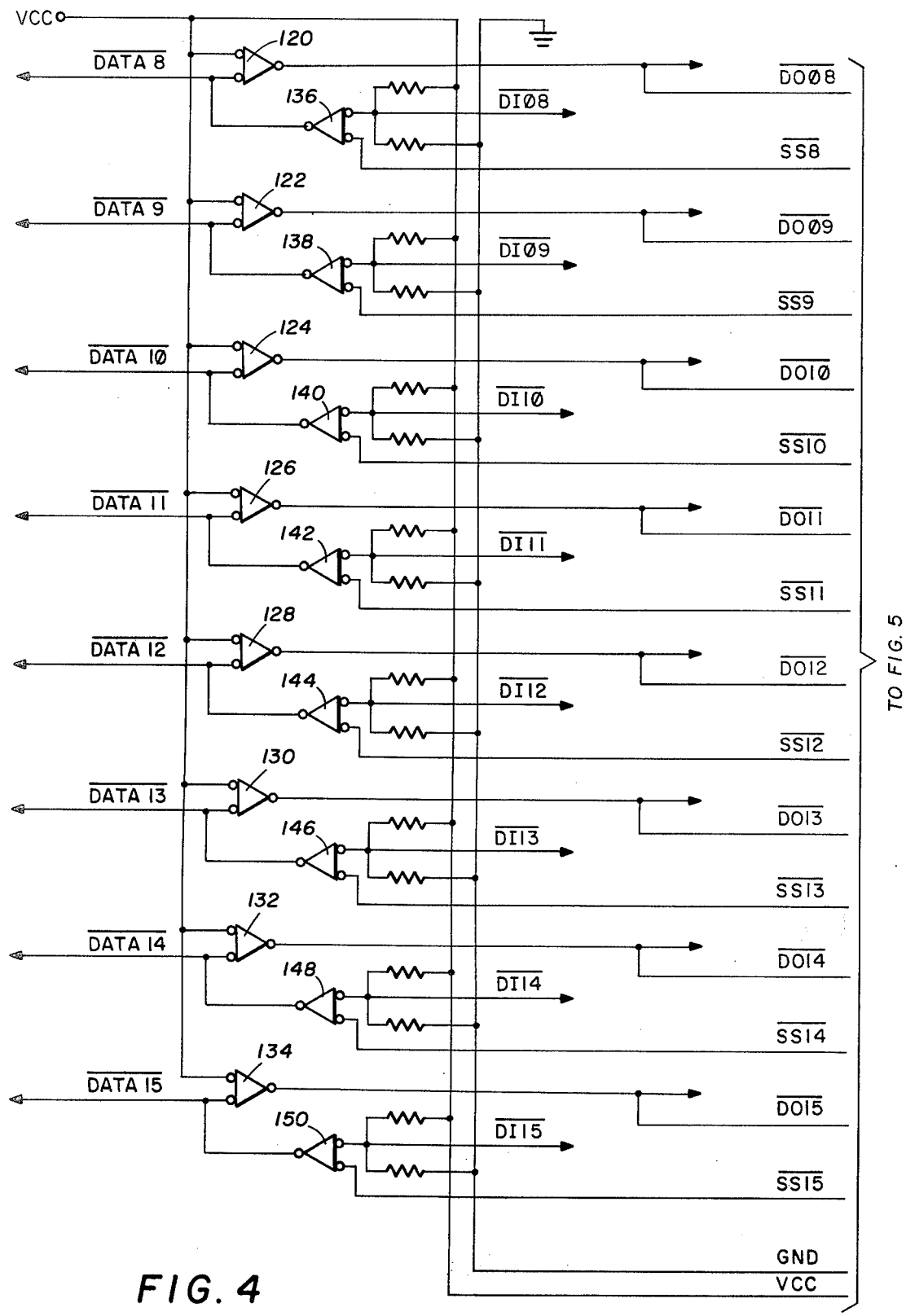
FIGS. 4-7 are schematic diagrams of the external bus driver circuit shown in FIG. 3.

Data bits DATA8-DATA15 are applied to the inputs of the bus driver shown in FIG. 4. These data bits from the central processor 36 are applied through drivers 120-134 and are applied at data output signal DO08-DI15 to the circuit shown in FIG. 5. Data input signal DI08-DI15 are applied through drivers 136-150 to the bi-directional bus for application to the central processor 36. The circuitry shown in FIG. 4 thus operates as a converter for converting the uni-directional bus 54 to two sets of uni-directional signals.

Figure 5:
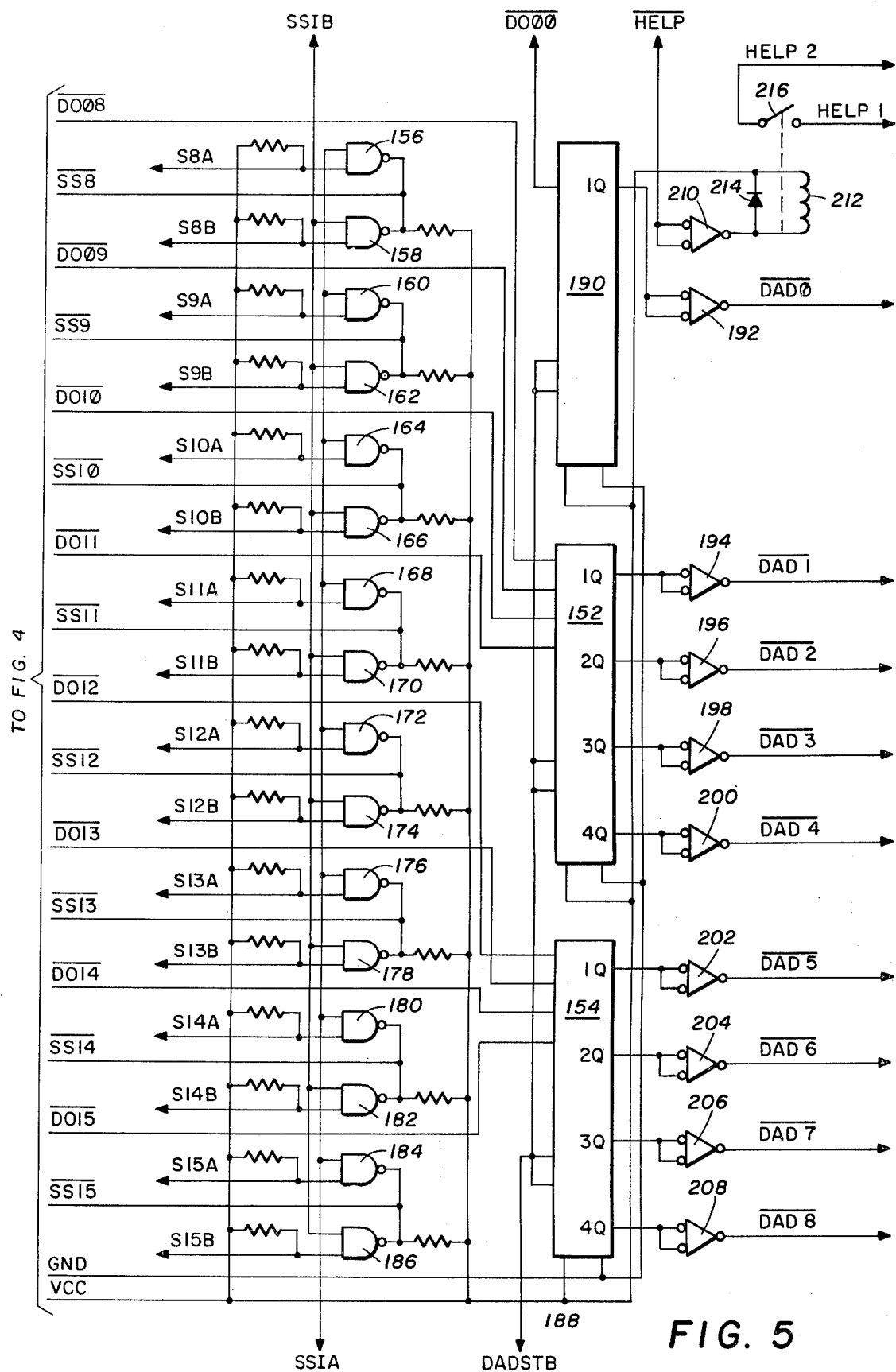

FIG. 5 is connected to the circuitry shown in FIG. 4 as illustrated. Data output signals DO08-DI11 are applied to inputs of a 4-bit latch 152. Data output signals DO12-DO15 are applied to inputs of 4-bit latches 154. Status words S8A-S15B are applied from inputs from NAND gates 156–186. The outputs of adjacent pairs of the NAND gates are tied together at the outputs and are applied to a common supply of bias voltage. The inputs of NAND gates 158, 162, 166, 170, 174, 178, 182 and 186 are commonly tied together and receive a gating signal SIB which is generated from the circuitry to be later described with respect to FIG. 7. The input of gates 156, 160, 164, 168, 172, 176, 180 and 184 are commonly tied together to receive a gating signal SSIA also from the circuitry shown in FIG. 7. Gates 156-186 may thus be selectively gated to allow the central processor 36 to read the system status as desired.

A device address strobe clocking signal DADSTB is applied via lead 188 to clock the latches 152 and 154 and also to clock a 4-bit latch 190. Latch 190 also receives a data output DO00 from the central processor 36. The outputs from the latches 152, 154 and 190 comprise a 9-bit device address signal $\overline{DAD0}$-$\overline{DAD8}$ which are applied through the drivers 192-208.

A $\overline{HELP}$ signal is applied through a driver 210 to a relay coil 212 connected across a diode 214. Operation of the relay coil 212 closes a $\overline{HELP}$ relay contact 216.

Figure 6:
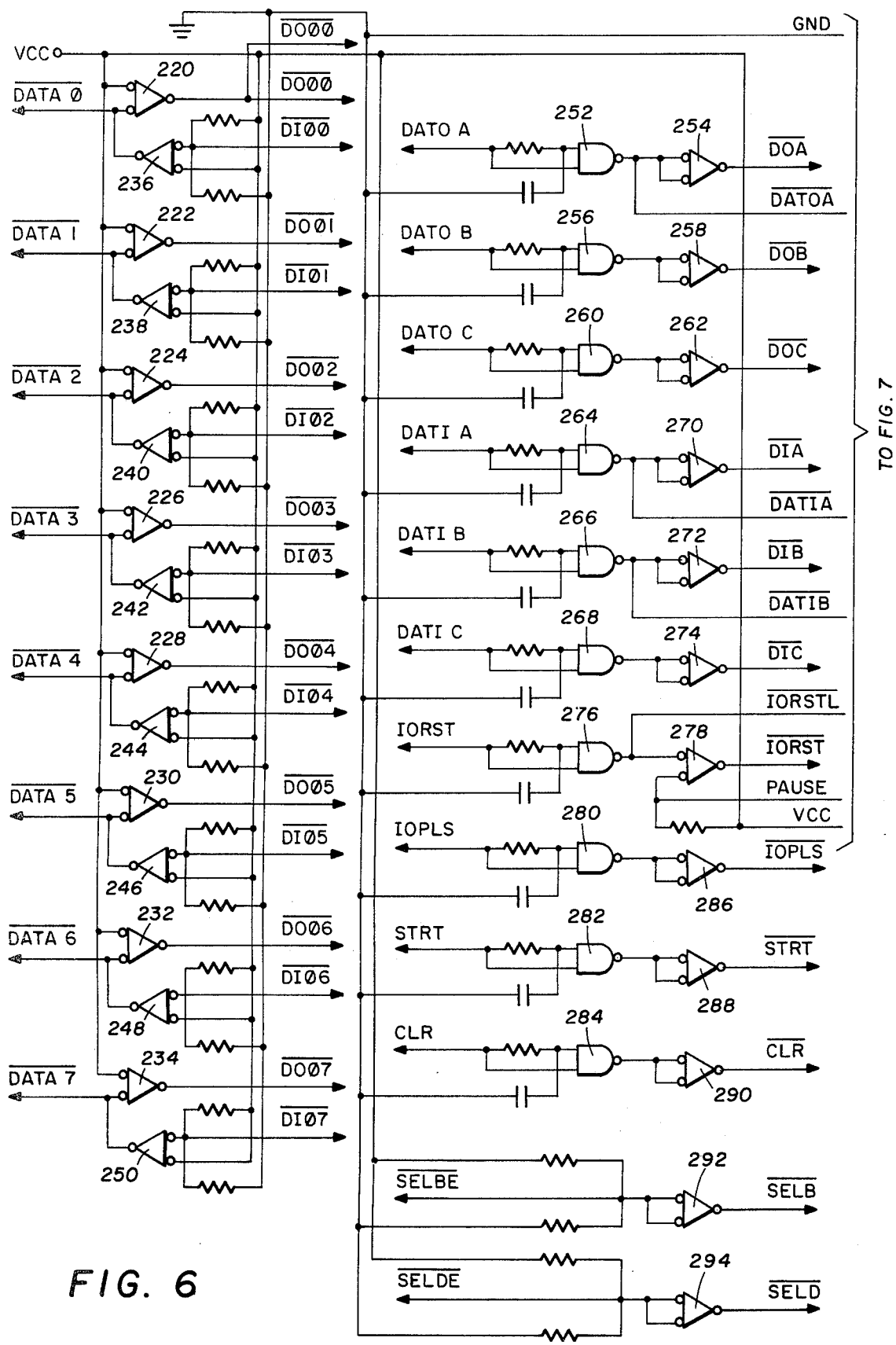

FIG. 6 illustrates additional circuitry within the bus driver 74. Drivers 220-234 receive data signals $\overline{DATA0}$-$\overline{DATA7}$ from the central processor via the in-out bus 54. The data output signals appearing at the output of drivers 220-234 comprise $\overline{DO00}$-$\overline{DO07}$. Data input signals for application to the central processor 36, DI00-DI07, are applied through drivers 236-250 to the bus 54.

The data out signal DATOA is applied through a NAND gate 252 and an inverter 254 to provide a command signal $\overline{DOA}$ to the present system. The $\overline{DATOA}$ signal is applied to the circuitry shown in FIG. 7. The DATOB signal is applied from the central processor 36 through a NAND gate 256 and a driver 258 to provide the command signal $\overline{DOB}$. Similarly, DATOC is applied through NAND gate 260 and driver 262 to provide the command signal $\overline{DOC}$. Data input signals DATIA-DATIC are applied through AND gates 264-268 and drivers 270-274 to provide command signals $\overline{DIA}$-$\overline{DIC}$.

The IO reset signal IORST is applied through a NAND gate 276 and a driver 278 to provide the reset signal $\overline{IORST}$. Similarly, command signals IOPLS, STRT, and CLR are applied through NAND gate 284 and are applied through drivers 286–290 as $\overline{IOPLS}$, $\overline{STRT}$, and $\overline{CLR}$. Command signals $\overline{SELBE}$ are applied through a driver 292 to provide the $\overline{SELB}$ signal, while $\overline{SELDE}$ is applied through driver 294 to provide $\overline{SELD}$.

Figure 7:
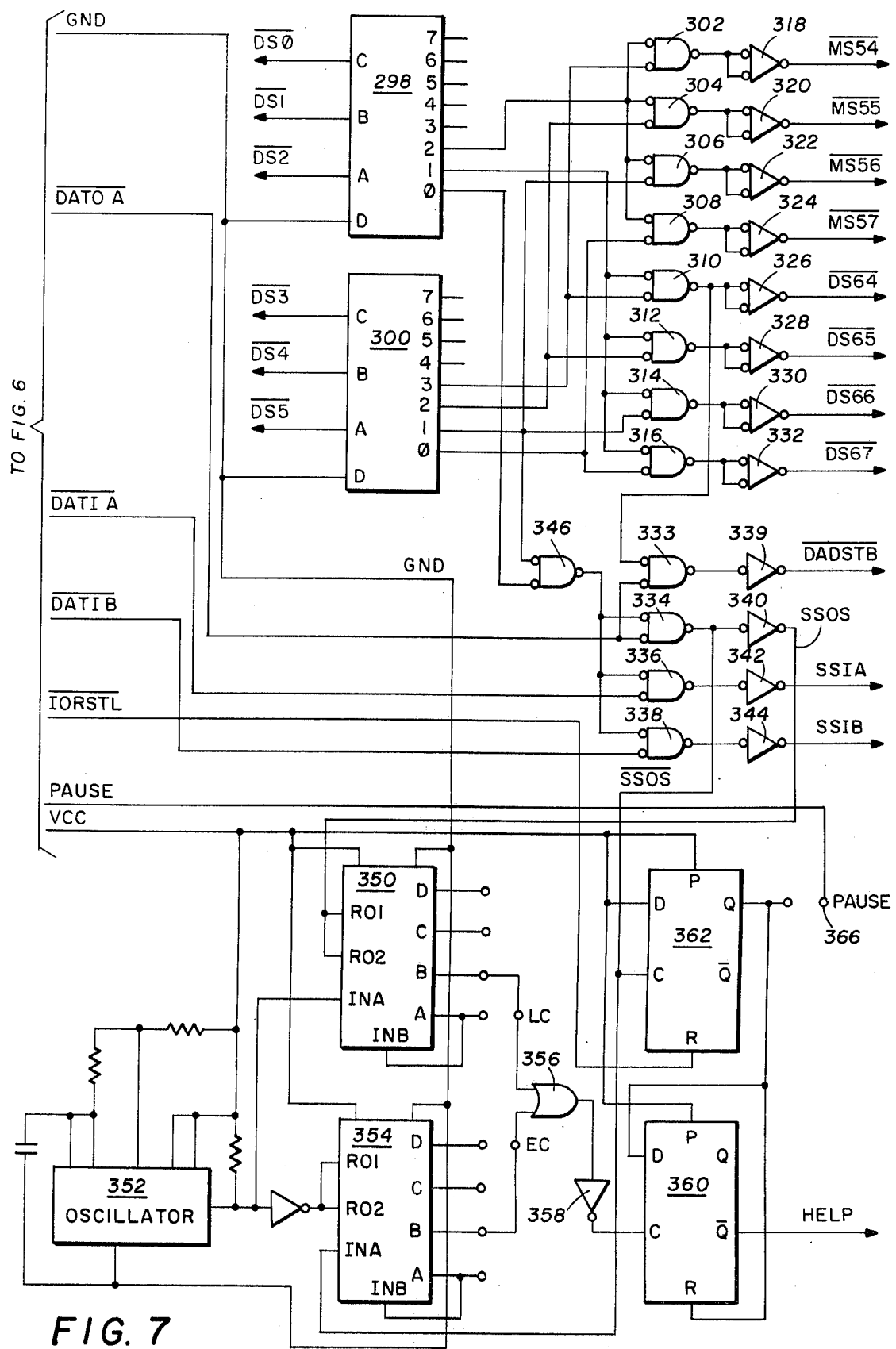

Device addresses $\overline{DS0}$-$\overline{DS2}$ are applied from the central processor to a 3-to-8 decoder 298 in FIG. 7. Similarly, device address signals $\overline{DS3}$-$\overline{DS5}$ are applied to a 3-to-8 decoder 300. Decoders 298 and 300 may comprise for example a SN7442 decoder. The decoded outputs from decoders 298 and 300 are applied to various inputs of NAND gates 302–316, the outputs of which are applied through drivers 318–332. The decoded outputs $\overline{MS54}$-$\overline{MS57}$ and $\overline{DS64}$-$\overline{DS67}$ are applied to select the switch matrix and other devices when desired. The preferred embodiment of the system utilizes only two of the decoded outputs, but the provision of the eight device select output enables enlargement of the system as desired by adding other selectable devices.

Signals $\overline{\text{DATOA}}$, $\overline{\text{DATIA}}$ and $\overline{\text{DATIB}}$ are applied to inputs of NAND gates 334–338, the outputs of which are applied through drivers 340–344 to provide signals SSOS, SSIA and SSIB. A NAND gate 333 is connected to the output of gate 310 and applies the DADSTB signal through a driver 339. A NAND gate 346 is connected at its inputs to the decoder 298 and to an input of gate 306 and is connected at the output to gates 334–338.

SSOS is applied to an input of a counter 350 which may comprise for example an SN7493 counter. An oscillator which has approximately a 100 millisecond duty cycle applied oscillating signals to the counter 350 and to a second counter 354 which also may comprise an SN7493 counter. Each of the counters 350 and 354 have four possible outputs, one of which may be selectively jumpered to an input of an OR gate 356, depending upon the time desired for the monitoring feature. The output of gate 356 is applied through a driver 358 to an input of a flipflop 360. Flipflop 360 applies the HELP signal previously shown in FIG. 5. Flipflop 360 is interconnected with a second flipflop 362 in order to generate a reset for the HELP circuit.

The monitor system comprising the oscillator 352, counters 350 and 354, and flipflops 360 and 362 is utilized to periodically monitor the status of the present system when periodically commanded by the central processor 36. If the monitor system does not receive a monitor request from the central processor 36 within a predetermined time determined by the counter 350, the flipflop 360 is flipped in order to operate the relay switch 216 shown in FIG. 5 in order to ring an alarm or to otherwise indicate a possible malfunction of the central processor. Counter 354 detects the number of monitor requests made by the central processor, and if this number is excessive, counter 354 also operates the system to generate a HELP signal in order to indicate a possible alarm situation. As previously noted, the monitor parameters of the system may be varied by varying the jumpers between the counters 350 and 354 and the gate 356.

The pause signal applied at terminal 366 is generated to release all resets applied to the system to enable operation of the system after a shutdown when the signal processor 36 has determined that all circuits are recovered and available for operation. The central processor 36 generally provides a time delay in order to allow all circuits to recover so that the system operation does not begin unless all circuits are properly operable.

In operation of the external bus driver shown in FIGS. 4–7, the circuit is primarily utilized as a buffer/-driver and decoder. Data signals from the central processor are applied through the bi-directional input-output bus 54 which generally provides 16 data channels. In the particular system utilized, only nine channels are utilized, $\overline{\text{DATA0}}$ and $\overline{\text{DATA8}}$-$\overline{\text{DATA15}}$. The nine data bits are applied to the various driver stages shown in FIGS. 4 and 5 in order to generate the signals $\overline{\text{DO00}}$ and $\overline{\text{DO08}}$-$\overline{\text{DO15}}$ which are then stored in a device address register comprising latches 152, 154 and 190. The output signals from the device register is a 9-bit device address $\overline{\text{DAT0}}$ and $\overline{\text{DAD1}}$-$\overline{\text{DAD8}}$ which is then clocked out to the DCM expander 76 by the strobe signal DATSTB (FIG. 5). The strobe signal DATSTB is derived as shown in FIG. 7 by the 6-bit address select signals $\overline{\text{DS0}}$-$\overline{\text{DS5}}$ which are applied from the I/O bus 54 to the decoder 298 and 300.

An IO command DATOA is inverted by gate 252 (FIG. 6) and is applied to gate 334 (FIG. 7). The decoder outputs are applied to gate 310 to generate device code $\overline{\text{DS64}}$ which is anded with $\overline{\text{DATOA}}$ to generate the DADSTB signal. The outputs from decoder 298 and 300 are applied to gates 302–316 to generate the device select signals $\overline{\text{DS64}}$-$\overline{\text{DS67}}$ for application to the DCM and $\overline{\text{MS54}}$-$\overline{\text{MS57}}$ to the switch matrix. Signals $\overline{\text{SELBE}}$ and $\overline{\text{SELDE}}$ are applied to drivers 292 and 294 for output to the external bus driver. Control signals DATOA-DATOC, DATIA-DATIC, IORST, IOPLS, STRT and CLR are inverted by positive NAND gates 252 and 284 and are applied to drivers 254–290 (FIG. 6).

THE DCM EXPANDER

Figure 8:
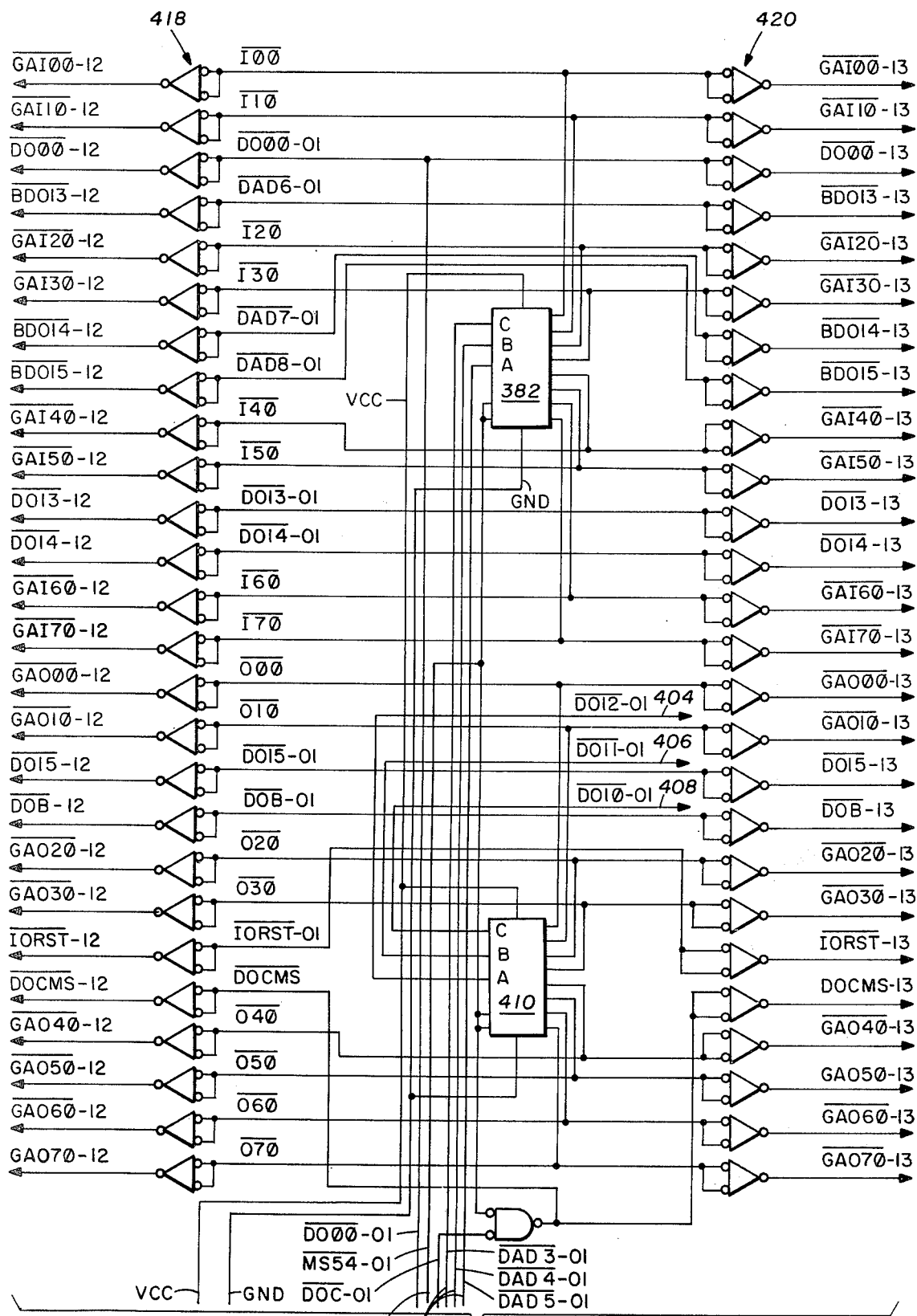
FIGS. 8-9 are schematic diagrams illustrating the DCM expander circuit shown in FIG. 3.
Figure 9:
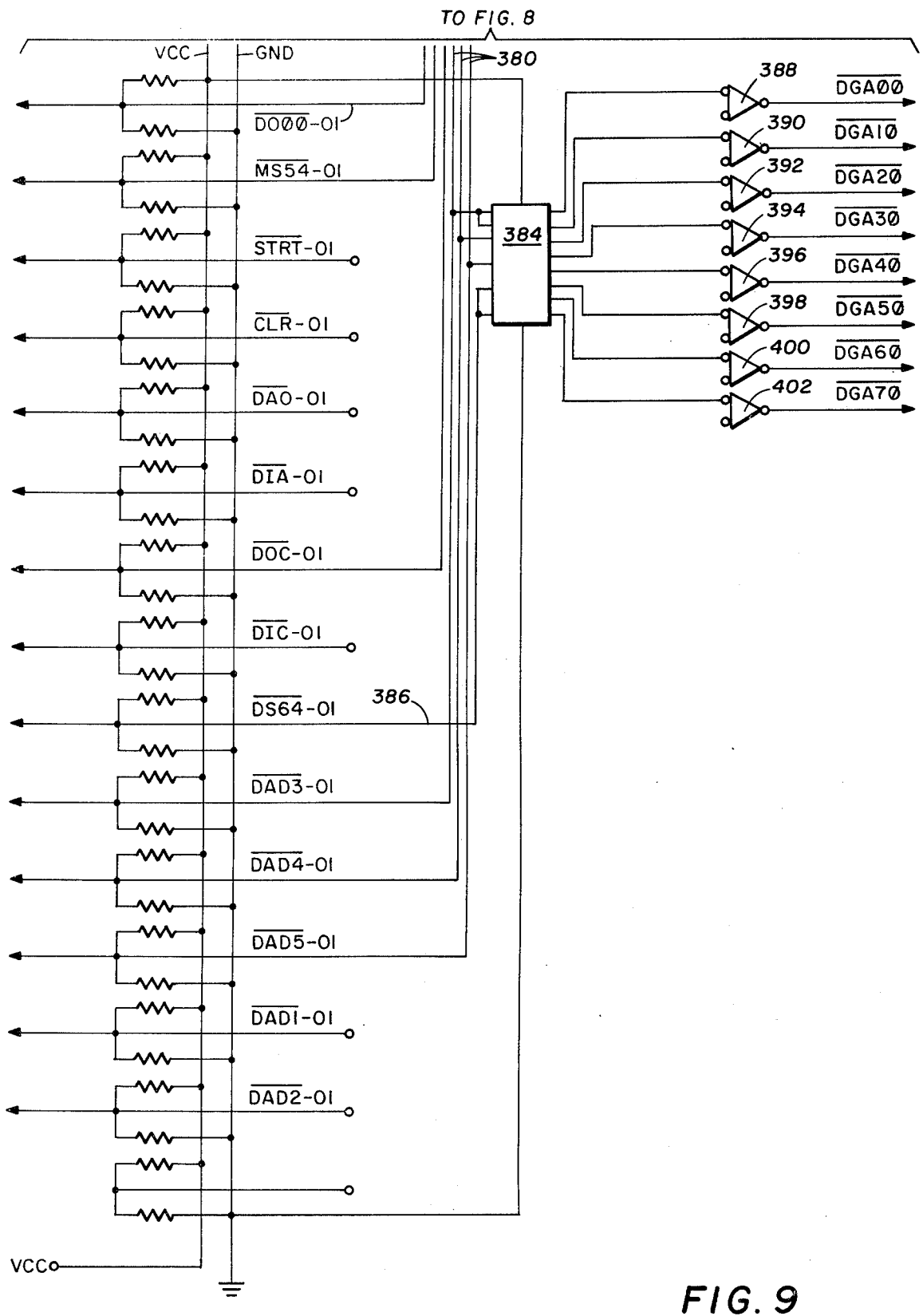

FIGS. 8 and 9 illustrate in schematic detail the device control module (DCM) expander 76 previously shown in FIG. 3. The expander circuit is utilized to decode, buffer and expand signals from the external bus line 34. All signals from the expander are applied to the DCM bus line 78, the EMM bus 110 and the BMM bus 111 (FIG. 3).

Device address signals $\overline{\text{DAD3}}$-$\overline{\text{DAD5}}$ are applied via lead 380 to three inputs of a decoder 382 (FIG. 9) and via lead 380 to three inputs of a second decoder 384 (FIG. 9). Device select $\overline{\text{DS64}}$ is applied from bus 34 via lead 386 to an input of the decoder 384 in order to generate device group address signals $\overline{\text{DGA0}}$-$\overline{\text{DGA70}}$ through drivers 388–402 (FIG. 9).

Signals $\overline{\text{DO10}}$, $\overline{\text{DO11}}$ and $\overline{\text{DO12}}$ are applied via lead 404-408 to inputs of a third decoder 410. Matrix select signal MS54 is applied on lead 414 (FIG. 8) to decoder 382 and decoder 410 in order to generate group address input and group address output signals as illustrated. Each of the group address input and output signals is expanded through ones of a plurality of drivers 418 and 420 to provide $\overline{\text{GAI00-12}}$-$\overline{\text{GAI7012}}$, $\overline{\text{GAI0013}}$ through $\overline{\text{GAI7013}}$, $\overline{\text{GAO00-12}}$ through $\overline{\text{GAO70-12}}$ and $\overline{\text{GAO00-13}}$ through $\overline{\text{GAO70-13}}$. Signals ending in 12 are routed to the BMM bus 111 (FIG. 3), while the signals ending in 13 are routed to the EMM bus line 110 (FIG. 3). Similarly, DOCMS, DOB, IORST, DO and DAD are expanded by the drivers 418 and 420 and are routed to the EMM bus 110 and the BMM bus 111 (FIG. 3).

To summarize the operation of the DCM expander 76, signals DO08-DO15 are applied to the register comprising latches 152, 154 and 190 previously shown in FIG. 5. The resulting DAD signals are applied to the decoder 384 shown in FIG. 9 and are strobed by $\overline{\text{DS64}}$ generated from driver 326 in FIG. 7 in order to generate the DGA00-DGA70 (FIG. 9). Similarly, DAD signals derived from the latches 152, 154 and 190 (FIG. 5) are applied to the 3-to-8 decoder 382 (FIG. 8) and are strobed by the $\overline{\text{MS54}}$ signal to generate GAI00-GAI70 signals.

Again, referring to FIG. 8, the DAD signals are applied through driver 418 in order to generate the $\overline{\text{BDO13}}$-$\overline{\text{BDO15}}$ which constitute the matrix inputs address one of eight inputs. The DO10 and $\overline{\text{DO11}}$-$\overline{\text{DO12}}$ signals are applied to the decoder 410 from the central processor through the bus 34 and result in the matrix output address (group of eight select), $\overline{\text{GAO00}}$-

GA070. The $\overline{DO13}$-$\overline{DO15}$ is also applied from the central processor 36 through driver 420 to generate the matrix output address select (one of eight output select), $\overline{DO13}$-$\overline{DO15}$.

THE VCA CONTROL

Figure 10:
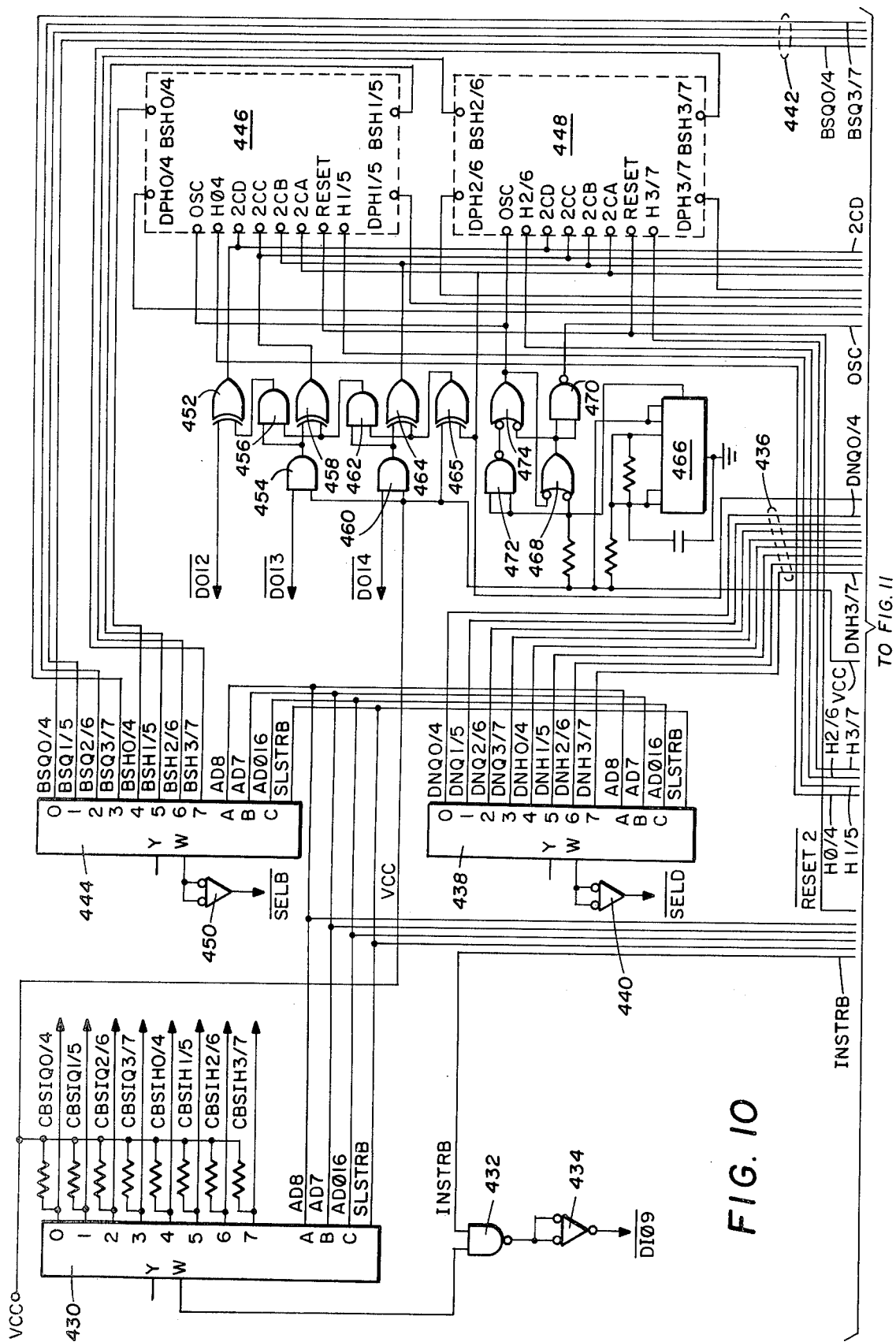
FIGS. 10 and 11 are schematic diagrams of the VCA control circuit shown in block diagram form in FIG. 3.
Figure 11:
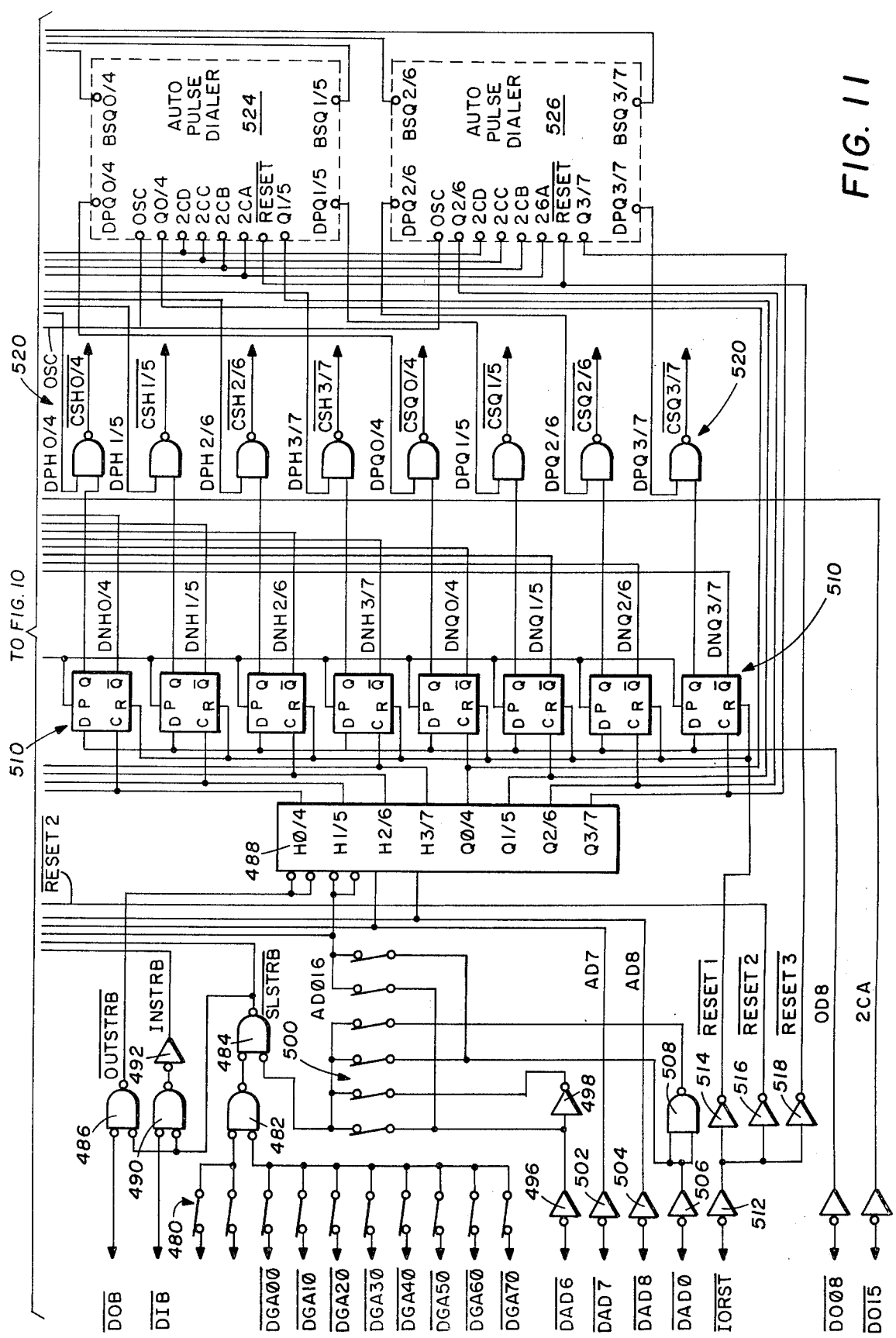

FIGS. 10 and 11 illustrate in schematic detail the construction of the VCA control circuit 82 shown in block diagram in FIG. 3. The VCA control circuit 82 processes device address and device group address signals from the expander circuit 76. In the preferred embodiment, up to four VCA control circuits may be provided, with each circuit containing up to four autopulse dialer units each including two identical separate circuits.

The VCA control circuit 82 processes device addresses to generate control signals to the input and output VCAs 16 and 18. Circuit 82 also multiplexes VCA signals to provide input data to the central processor 36. Referring to FIG. 10, signals from the input VCA 16 (FIG. 1) CBSIQO/4-CBSIQ3/7 are applied to terminals 0–3 of a multiplexer 430. Signals from the output VCA 18, CBSIHO/4-CBSIH3/7, are applied to input terminals 4–7 of the multiplexer 430. DAD signals to be subsequently described are converted into device address signals AD8, AD7 and AD016 and are applied to terminals A-C of the multiplexer 430. A strobe signal SLSTRB is applied to strobe multiplexer 430. The output of the multiplexer 430 is applied through a NAND gate 432 and a driver 434 to provide the DI09 signal which is applied to the central processor 36.

Signals DNQ014-DNH317 are applied via leads 436 to the inputs of a multiplexer 438. In addition, device address signals AD8-AD016 are also applied to multiplexer 438. The strobe signal SLSTRB is also applied to multiplexer 438 in order to output, via the driver 440, the $\overline{SELD}$ signal which is utilized to provide a check to determine whether or not a request has been made on a device.

Similarly, signals BSQ)14-BSQ3/7 are applied via terminals 442 to the inputs of a multiplexer 444. Signals BSHO/4-BSH3/7 are applied from autopulse dialers 446 and 448. The device select signals AD8-AD016 and the strobe signal SLSTRBR are also applied to multiplexer 444 in order to strobe through a driver 450 the $\overline{SELB}$ signal which is applied to the central processor 36.

The $\overline{DO12}$ signal is applied through an exclusive OR gate 452 to the autopulse dialers 446 and 448. The $\overline{DO13}$ signal is applied through an AND gate 454 and an AND gate 456 to an input of exclusive OR gate 452 and also to an input of an exclusive OR gate 458 connected to the autopulse dialer 446. The $\overline{DO14}$ signal is applied through an AND gate 460 and an AND gate 462 and to an exclusive OR gate 464 connected to the autopulse dialers 446 and 448.

A timing oscillator 466 generates a 10 Hz 60-40 duty cycle output, with 60 seconds on and 40 seconds off. The output of oscillator 466 is applied through an OR gate 468 and NAND gate 470 to autopulse dialers shown in FIG. 11. The output of oscillator 466 is also applied through an NAND gate 472 and OR gate 474 to the autopulse dialers 446 and 448.

Referring to FIG. 11, which illustrates the remainder of the VCA control circuit, eight device group addresses DGA00DGA70 are applied through contacts of a switch 480 to inputs of a NAND gate 482 which is applied to a NAND gate 484 to generate the $\overline{SLSTRB}$ signal. This strobe signal is applied to the multiplexers 430, 444 and 438 previously shown in FIG. 10. The $\overline{DOB}$ signal is applied to a NAND gate 486 to generate the $\overline{OUTSTRB}$ signal which is applied to a decoder 488. The $\overline{DIB}$ signal is applied through a NAND gate 490 and a driver 492 to provide the INSTRB signal which is applied to strobe the NAND gate 432 shown in FIG. 10.

The device address signal $\overline{DAD6}$ is applied through drivers 496 and 498 to a switch 500 for application to the NAND gate 484. Signals $\overline{DAD7}$-$\overline{DAD8}$ are applied through drivers 502 and 504 to the decoder 488 and to the multiplexer 430 shown in FIG. 10. Signal DAD0 is applied through a driver 506, a NAND gate 508, the switch 500 to gate 484 and to the decoder 488.

The output of decoder 488 is applied to eight flipflops 510. The Q outputs of the flipflops 510 represent DNHO/4-DNQ3/7 signals which are applied to multiplexer 438 shown in FIG. 10. Flipflops 510 are reset by the $\overline{IORST}$ signal which is applied through drivers 512 and 514. Additional reset signals are applied through drivers 516 and 518 for application to various other areas of the VCA control circuit.

The Q outputs of each of the flipflops 510 are applied to eight NAND gates 520 which generate signals $\overline{CSHO/4}$-$\overline{CHQ3/7}$ which are utilized in other portions of the system. Inputs to the NAND gates 520 are connected to terminals of the autopulse dialers 446 and 448 and to autopulse dialers 524 and 526.

In operation of the VCA control circuit, the switch 480 may be set to select one group of 16 addresses from the eight device group addresses $\overline{DGA0}$ through $\overline{DGA70}$. The device address signals $\overline{DAD6}$ through $\overline{DAD8}$ select specific device addresses. The signal DAD0 selects either an input or an output device, with a logic 1 being provided for an output device and a logic "0" being provided for an input device. The configuration of the switches 480 and 500 is thus utilized to select eight devices which may comprise four input and four output devices, eight input devices, or eight output devices.

The bits $\overline{DAD7}$ and $\overline{DAD8}$ are applied to the decoder 488. The bit $\overline{DAD8}$ and $\overline{DAD6}$ are applied to the switch 500 as illustrated. The timing oscillator 466 (FIG. 10) generates a 10 Hz signal the output of which is applied to the input of the four autopulse dialers. As will be subsequently shown in FIG. 12, this clock output is utilized to clock binary counters within the pulse dialers. The BCD inputs $\overline{DO12}$-$\overline{DO14}$ (FIG. 10) are applied through the illustrated gates, whereon the BCD input is converted to two's complement and are applied to each of the autopulse dialers 446, 448, 524 and 526.

THE AUTOPULSE DIALER

Figure 12:
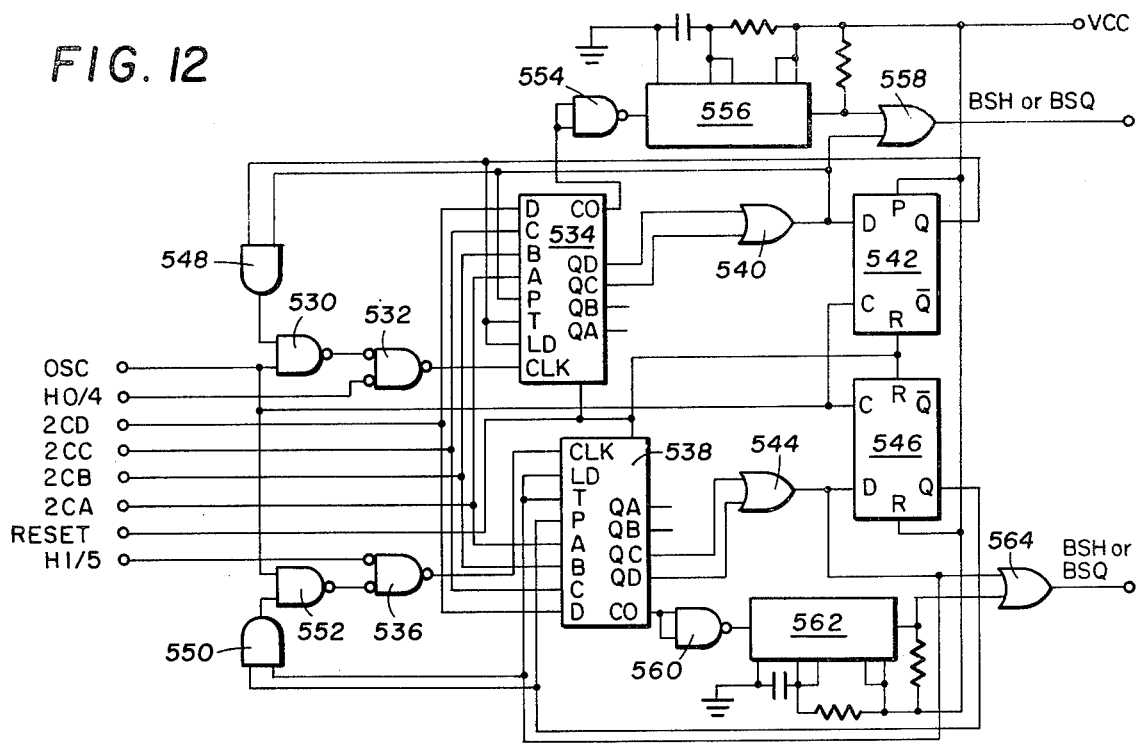
FIG. 12 illustrates a schematic diagram of the auto-pulse dialer.

FIG. 12 illustrates in schematic detail one of the autopulse dialers 446–448 and 524–526 shown in FIGS. 10 and 11. Signal OSC from the timing oscillator 466 (FIG. 10) is applied to a NAND gate 530 and a NAND gate 532 to the clock input of a counter 534. Similarly, a signal H1/5 is applied through a NAND gate 536 to the clock input of a counter 538. Signal H1/5 is derived from the decoder 488 (FIG. 11).

Signal HO/4 is applied to the input of gate 532. Signals 2CD-2CA generated from the outputs of gates 452, 458, 464 and 465 are applied to inputs of counter 534 and 538. Output from the counter 534 is applied through an OR gate 540 to a flipflop 542. Outputs from counter 538 are applied through NOR gate 544 to a flipflop 546. The Q output from flipflop 542 is applied to an input of an AND gate 548 connected to AND gate 530. Similarly, the Q output from flipflop 546 is applied to an input of an AND gate 550, the output of which is applied through a NAND gate 552 to gate 536.

The CO output of counter 534 is applied through a NAND gate 554 to a timing oscillator 556, the output of which is applied through an OR gate 558 to generate either a BSH or BSQ signal as shown in FIGS. 10 and 11. The CO output of counter 538 is applied through a NAND gate 560 to a timing oscillator 562. Oscillator 562 generates an output applied through an OR gate 564 to generate either a BSH or a BSQ signal. The pulses applied from the timing circuits 556 and 562 are applied to the multiplexer 444 (FIG. 10) during the dialing time and for 600 msec thereafter. The $\overline{\text{SELB}}$ signal is generated from the driver 450 (FIG. 10) for this time frame and is applied to the central processor 36.

THE IDM DISPLAY

Figure 13:
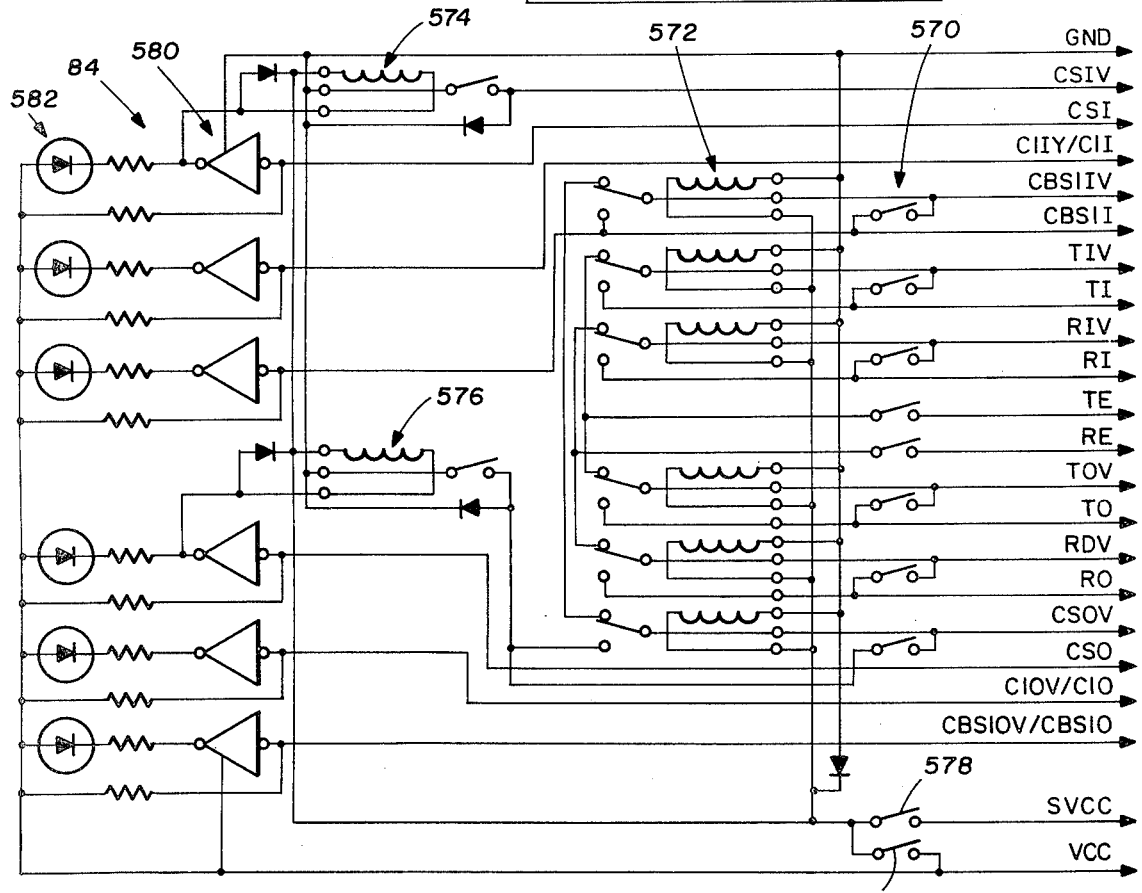
FIG. 13 is a schematic diagram of the IDM display.

FIG. 13 illustrates in schematic detail the Interface Display Module (IDM) display 84 previously shown in FIG. 3. The IDM display 84 has routed therethrough VCA control signals from the VCA control circuit 82 and utilizes the control signals to provide a light emitting diode (LED) display of the control signal. This circuit includes a switch 570 having ten switch contacts. The circuit also includes six relays 572 and relays 574 and 576. Operation of the relays 572 is controlled by opening and closing of switch contact 578 in order to control the routing of certain of the signals to the LEDs. The VCA control signals are applied through six drivers 580 to six light emitting diodes (LEDs) 582 which become illuminated when energized to indicate the activity of the VCA circuitry. Relay 574 is operable in response to closure of switch contacts 578 in order to control the display of select signals.

The signals from the output VCA 18 are routed through a transformer (not shown) to output ports on the BMM bus 11 (FIG. 3). Signals between the input VCA 16 and the BMM input ports are connected to BMM bus 111 (FIG. 3) through a transformer (not shown) and an audio amplifier module. The LED displays 582 also receive signals from the dial tone generator and the tone signal generator, to be subsequently described, in order to display the activity thereof.

TONE SIGNAL RECEIVER

Figure 14:
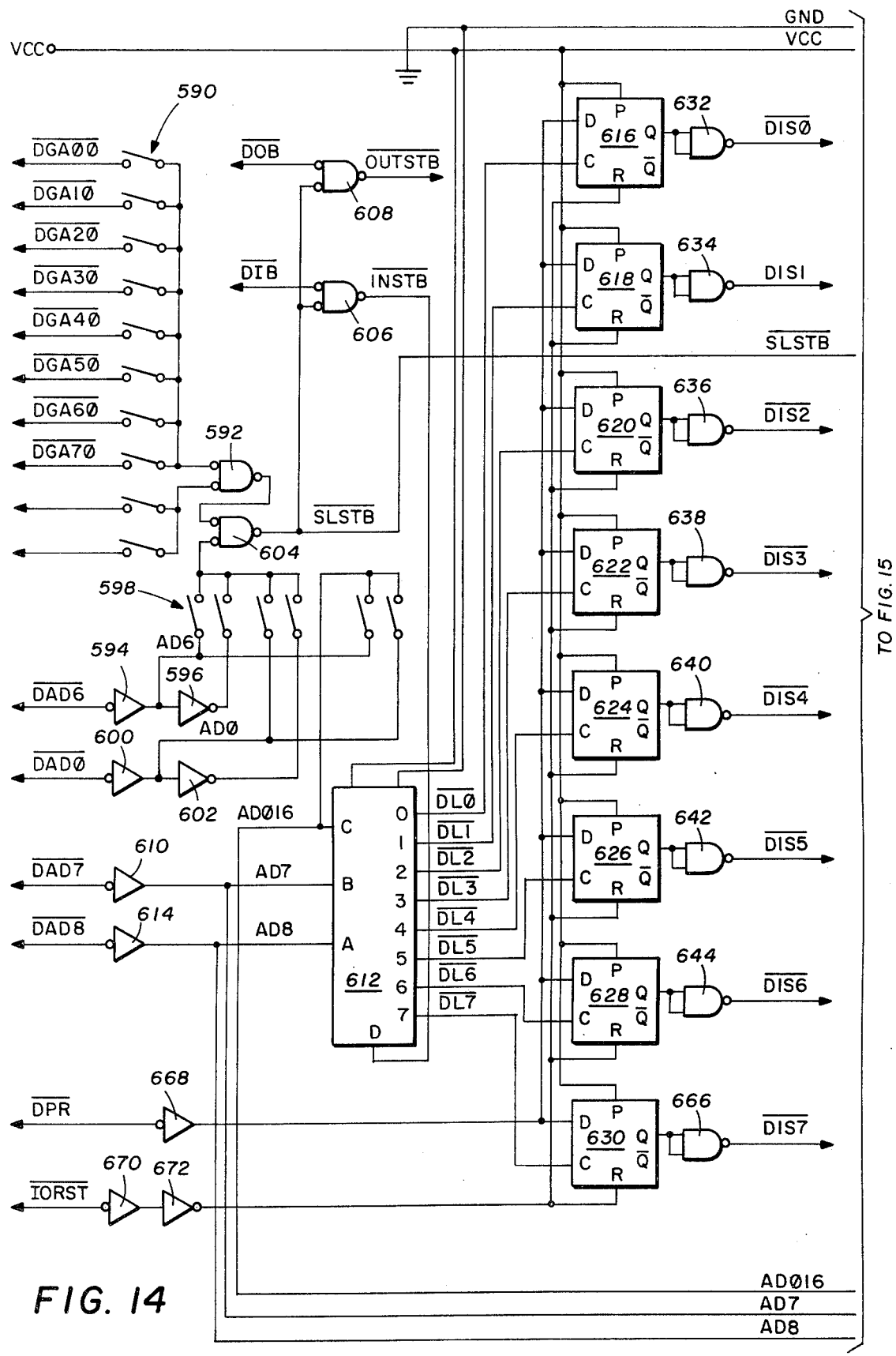
FIGS 14-15 are schematic diagrams of the tone signal receiver.
Figure 15:
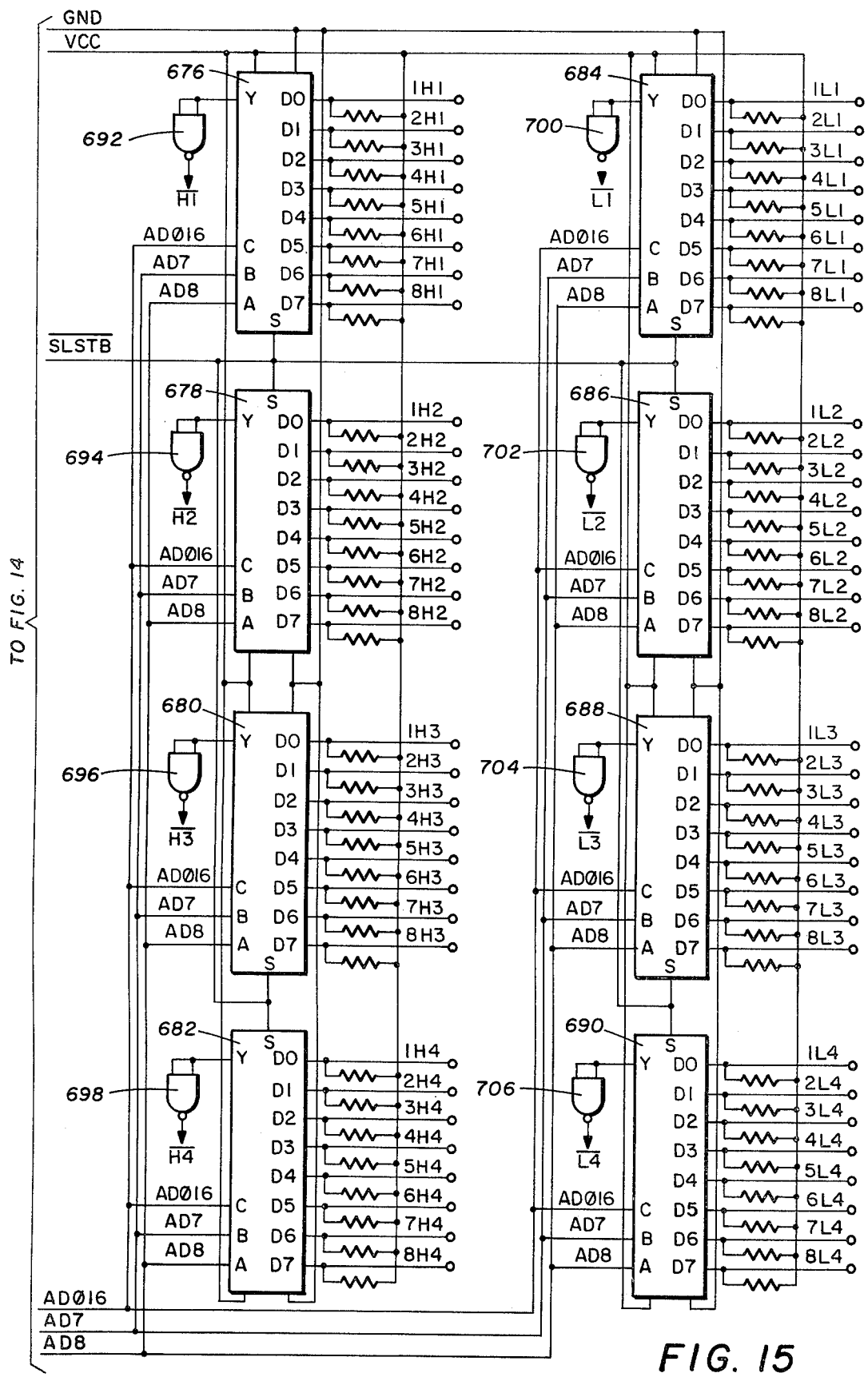

FIGS. 14 and 15 illustrate in schematic detail the construction of the tone signal receiver 86 previously shown in FIG. 3 and which is connected to the bus 78 extending from the DCM expander 76 and the DCM terminator 80 (FIG. 3).

Referring to FIG. 14, $\overline{\text{DGA0-DGA70}}$ signals are applied to terminals of a switch 590 which is connected to an input of a NAND gate 592. Signal $\overline{\text{DAD6}}$ is applied through an invertor 594 and a driver 596 to a switch 598. Similarly, signal $\overline{\text{DAD0}}$ is applied through an invertor 600 and through a driver 602 to various other terminals of the switch 598. The output of switch 598 is applied to an input of a NAND gate 604, the other input of which is connected to the output of gate 592. The output of gate 604 generates the strobe signal $\overline{\text{SLSTB}}$ which is applied to the circuitry shown in FIG. 15 and which also is applied to inputs of NAND gates 606 and 608. Signal $\overline{\text{DIB}}$ is applied to gate 606 to generate the signal $\overline{\text{INSTB}}$, while signal $\overline{\text{DOB}}$ is applied to gate 608 to generate the signal $\overline{\text{OUTSTB}}$.

Signal $\overline{\text{DAD7}}$ is applied through an invertor 610 to a decoder 612 and signal $\overline{\text{DAD8}}$ is applied through an invertor 614 to decoder 612. The outputs of the decoder 612, $\overline{\text{DL0-DL7}}$, are applied to inputs of flipflops 616–630. The outputs from the decoder 612 are clocked into the flipflop 616–630 when $\overline{\text{DIB}}$ is received from the central processor through gate 606. The Q outputs of the flipflops 616–630 are applied through NAND gates 632–666 to generate display signals $\overline{\text{DIS0}}$-$\overline{\text{DIS7}}$. The display signals are routed to the IDM circuit shown in FIG. 13 and utilized to turn on the LED 582 to indicate to the operator that the central processor 36 has completed processing. In addition, the signal $\overline{\text{DPR}}$ is applied through an invertor 668 to flipflop 630, while signal $\overline{\text{IORST}}$ is applied through invertor 670 and driver 672 to the reset inputs of each of the flipflops 616–630.

Referring to FIG. 15, eight multiplexers 676–690 are connected to receive the addressing signals AD016, AD7 and AD8. Each one of the multiplexers 767–690 has eight inputs connected to one of eight tone receiver circuits, not shown. In the preferred embodiment, the tone receiver circuits may comprise a conventional ME8810J receiver which is attached to the telephone line in order to detect tones generated on the telephone line and to provide eight open collector outputs indicative of the tones detected:

Although not shown, the ME8810J receiver will now be briefly described. The ME8810J receiver comprises a balanced input attached to the telephone line for supplying signals through a high pass prefilter and an ME8801 AGC circuit. The output of the AGC circuit is applied to an ME8802 module including eight band pass filters. The output of the pass filters is applied to two ME8803 module detector triggers. A pivoting trigger voltage circuit is attached between the ME8803 detector trigger. The outputs from the ME8803 module detector triggers comprise eight open-collector outputs which are representative of a particular tone detected from the telephone lines.

These eight outputs are collector connected to the inputs of one of the multiplexers 676–690. The output from the multiplexers 676–690 are applied through NAND gates 692–706 to provide outputs $\overline{\text{H1-H4}}$ and $\overline{\text{L1-L4}}$. These outputs represent the following frequencies:

| | |
|---|---|
| $\overline{\text{L1}}$-697 Hz | $\overline{\text{H1}}$-1209 Hz |
| $\overline{\text{L2}}$-770 Hz | $\overline{\text{H2}}$-1336 Hz |
| $\overline{\text{L3}}$-852 Hz | $\overline{\text{H3}}$-1477 Hz |
| $\overline{\text{L4}}$-941 Hz | $\overline{\text{H4}}$-1633 Hz |

As is known, depression of buttons on a conventional "Touchtone" telephone can generate twelve combinations of two tones. The output from the multiplexer 676–690 thus provides an indication of the tones being generated from the telephone at the user's facility and applies that information to the central processor 36. These signals $\overline{\text{H1-L4}}$ are only generated when the multiplexers are addressed by the $\overline{\text{AD016-AD8}}$ signals. The outputs $\overline{\text{H1-L4}}$ are applied to the terminator circuit 80 (FIG. 3), wherein they are decoded and are applied to the central processor 36. The central processor 36 is thus provided with an indication of the digits dialed by the operator at the user'facility.

SIGNAL GENERATOR BASE CIRCUITRY

Figure 16:
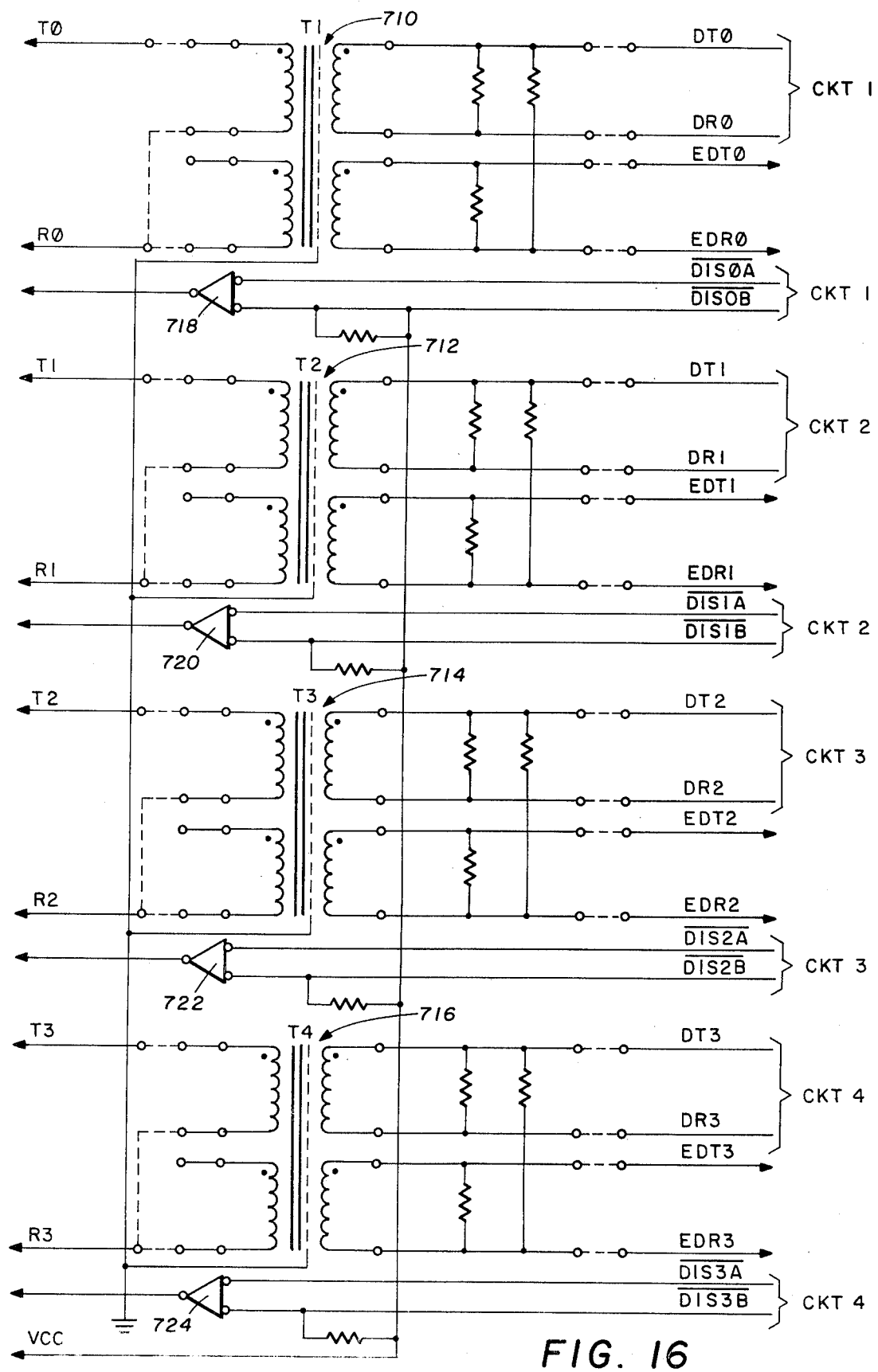
FIGS. 16-18 are schematic diagrams of the signal generator base circuitry.
Figure 17:
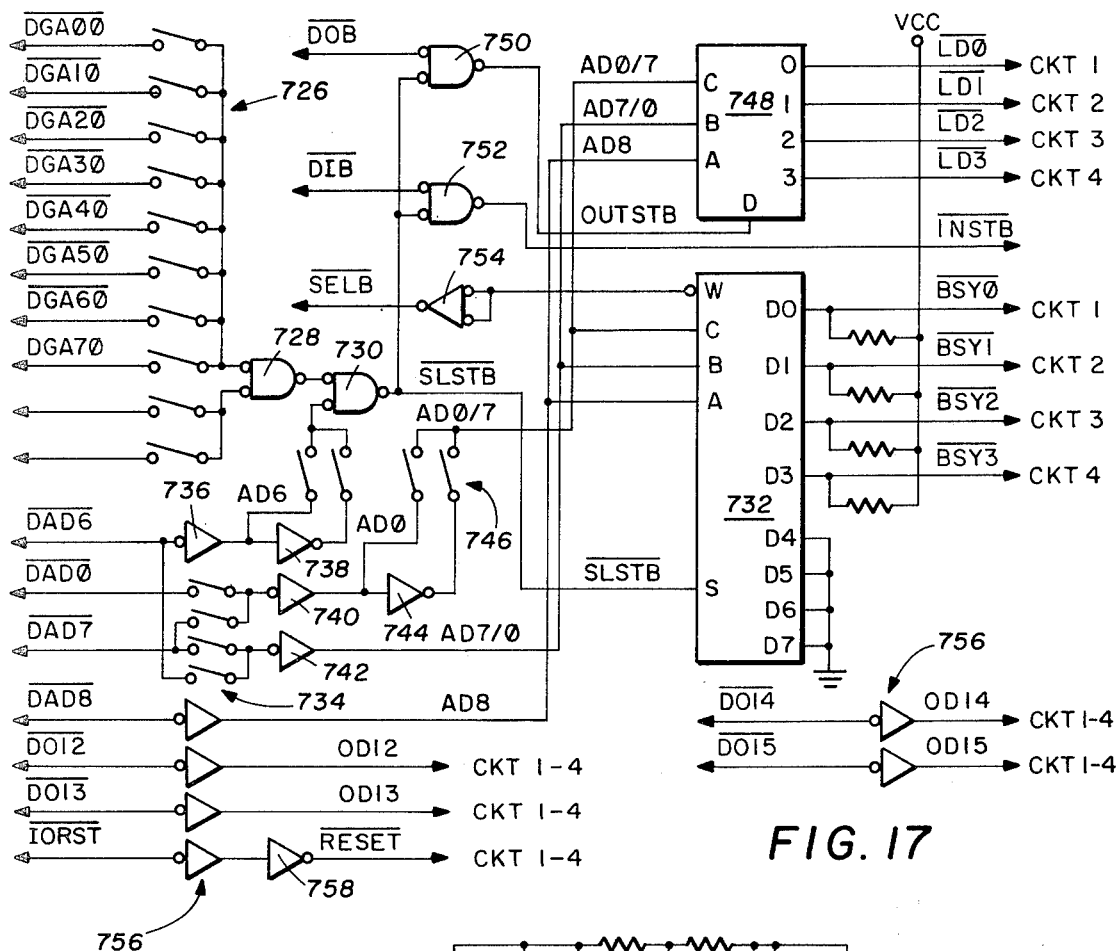
Figure 18:
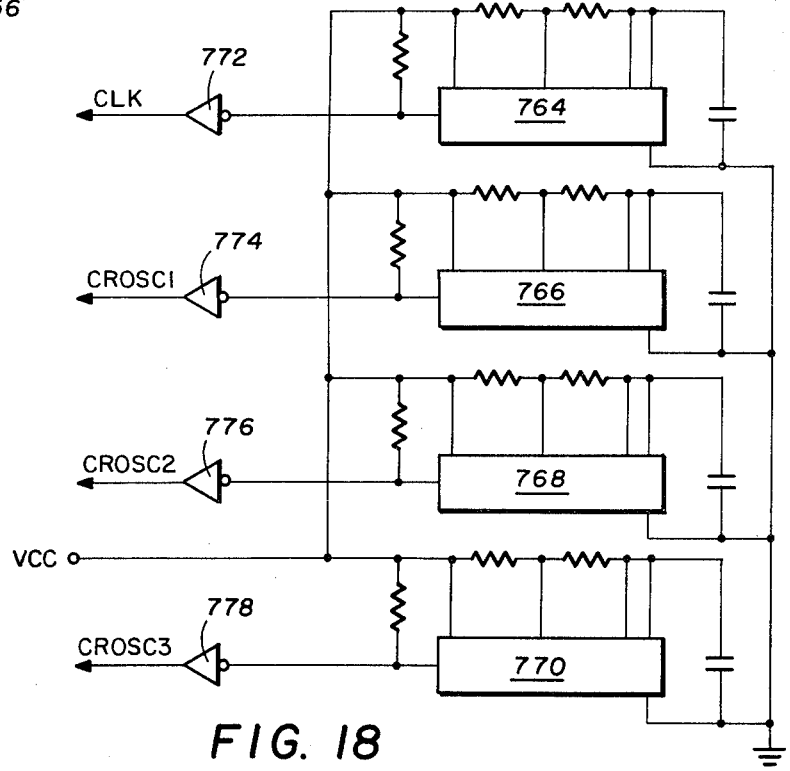

FIGS. 16, 17 and 18 illustrate the signal generator base circuitry which interconnects between bus 78 and four dial tone generators 88 or four tone signal generators 92 shown in FIG. 3. In practice, the circuits shown in FIG. 3 would then comprise two of the signal generator base circuits illustrated in FIGS. 16-18, one of the base circuits being connected to four dial tone generators and the other base circuit being connected to four tone signal generators.

Referring to FIG. 16, four transformers 710-716 receive DT and DR signals from either the dial tone generator or a tone signal generator (noted as circuits 1-4). Each of the transformers 710-716 provide input to the touchtone receiver as signals EDT0-3 and EDR0-3. The opposite side of transformers T1-T4 connect signals T0-T3 and R0-R3 and to the switch matrix to be subsequently described. When the base circuitry is interfaced with a dial tone circuit, the transformers 710-716 will connect to the switch matrix output port and if the base circuit is interfaced with a tone signal generator circuit, the transformers 710-716 will connect to the switch matrix input ports.

$\overline{\text{DIS0A-DIS3A}}$ signals are applied from either the dial tone generator or the tone signal generator through drivers 718-724. Similarly, signals $\overline{\text{DIS0B-DIS3}}$ are applied from the circuit to the other inputs of the drivers 718-724.

FIG. 17 illustrates another portion of the signal generator base circuitry wherein group address signals $\overline{\text{DGA00-DGA70}}$ are applied through a switch 726 and NAND gates 728 and 730 to provide the signal $\overline{\text{SLSTB}}$ which is applied to the strobe input of a multiplexer 732. Signals $\overline{\text{DAD6}}$, $\overline{\text{DAD0}}$ and $\overline{\text{DAD7}}$ are applied through a switch 734 and invertors 736-744 to the NAND gate 730 and also through a switch 746 to the C inputs of the multiplexer 732 and a decoder 748. Signal $\overline{\text{DOB}}$ is applied through a NAND gate 750 to the decoders 748 from the central processor 36 to generate the signal $\overline{\text{OUTSTB}}$. Signal $\overline{\text{OUTSTB}}$ clocks out the $\overline{\text{LD0-LD3}}$ signals from the decoder 748 for application to the tone signal generator. Signal $\overline{\text{DIB}}$ is applied through a NAND gate 752 to provide the $\overline{\text{INSTB}}$ signal. The $\overline{\text{BSY0-BSY3}}$ signals are applied from the dial tone generator through the multiplexer 732 and are clocked by $\overline{\text{SLSTB}}$ to generate the select busy signal $\overline{\text{SELB}}$ through the driver 754. The signals $\overline{\text{DO12}}$ through $\overline{\text{DO15}}$ are inverted by inverter 756 to generate 0D12-OD15 signals for application to the four tone signal generators. Similarly, the $\overline{\text{IORST}}$ signals are applied through an invertor 756 and a driver 758 to provide the $\overline{\text{RESET}}$ signal to the four tone signal generator.

Referring to FIG. 18, timing oscillators 764-770 generate chop rate oscillator signals CLK and CROSC1-3 each having a different clock period. The timing oscillators 764-770 may comprise for example a NE555 oscillator circuit. The CLK clock signal is applied through an invertor 772 and is utilized to clock a flipflop in the tone signal generator. The CROSC1-3 signals are applied through invertors 774-778 to the dial tone generator to provide a fast or slow chop rate.

DIAL TONE GENERATOR

Figure 19:
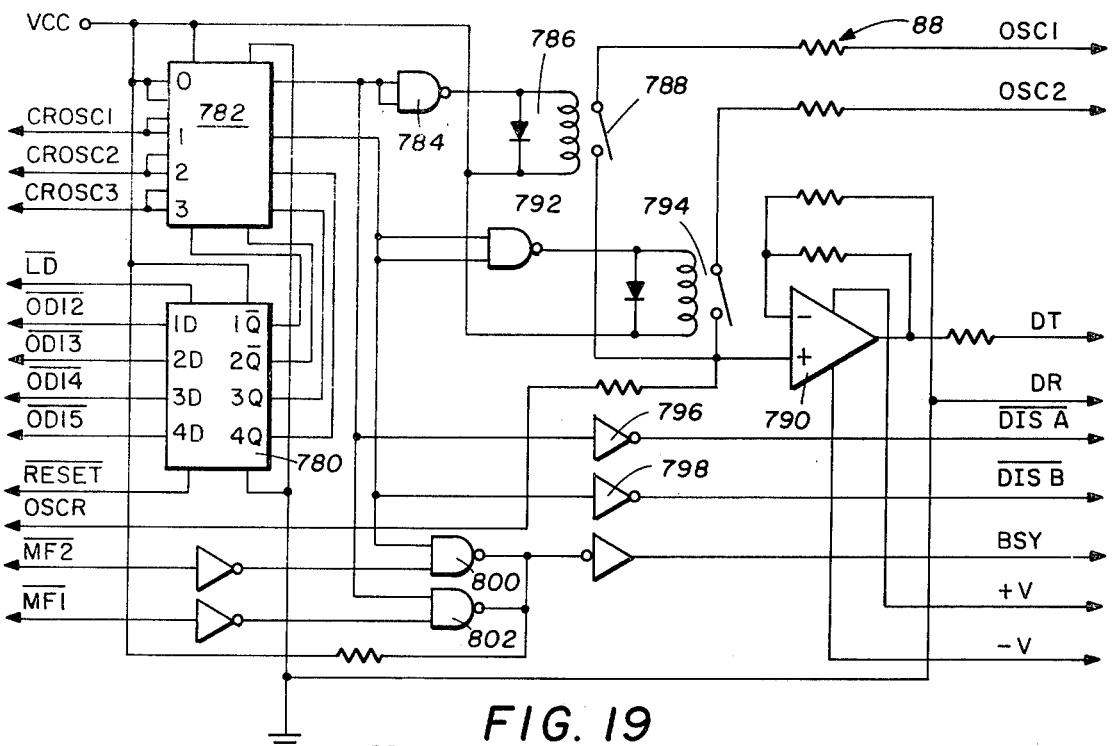
FIG. 19 is a schematic diagram of the dial tone generator.

FIG. 19 illustrates in schematic detail the dial tone generator 88 previously shown in FIG. 3. As previously noted, four dial tone generators will be attached to one of the signals generator base circuits shown in FIGS. 17 and 18. The dial tone generator provides a 440 Hz signal to the signal generator base circuit. Referring to FIG. 19, signals $\overline{\text{OD12}}$ through $\overline{\text{OD15}}$ are applied to a latch 780. When the $\overline{\text{LD}}$ signal is applied to the latch 780, the data is clocked out to a multiplexer 782 and to a NAND gate 784. The chop rate oscillator signals CROSC1-3 previously generated in the circuitry of FIG. 18 is applied to the multiplexer 782 in order to generate an output from the multiplexer 782 through the gates 784. This output energizes the relay coil 786 to close a relay switch contact 788. The 440 Hz OSC1 signal is then applied to the closed relay switch member 788 to an input of an operational amplifier 790. In addition, multiplexer 782 operates through NAND gate 792 the relay 794 to supply an alternate oscillator signal OSC1 to the amplifier 790 as a back up. The output of amplifier 790 is routed to the transformers shown in FIG. 16 in the base generator circuits.

Display signals $\overline{\text{DISA}}$ and $\overline{\text{DISB}}$ are applied through drivers 796 and 798 to the base generator card for application to the IDM for operation of the LEDs. Signals $\overline{\text{MF1}}$ and $\overline{\text{MF2}}$ are detector signals generated by the DCM terminator circuitry in order to detect which of the two oscillators is in use. Each detector system is applied to two NAND gates 800 and 802 in conjunction with the output signal from the multiplexer 782, in order to generate the DSY signal which is applied to the base generator circuitry to generate the select busy signal for application to the central processor 36.

TONE SIGNAL GENERATOR

Figure 20:
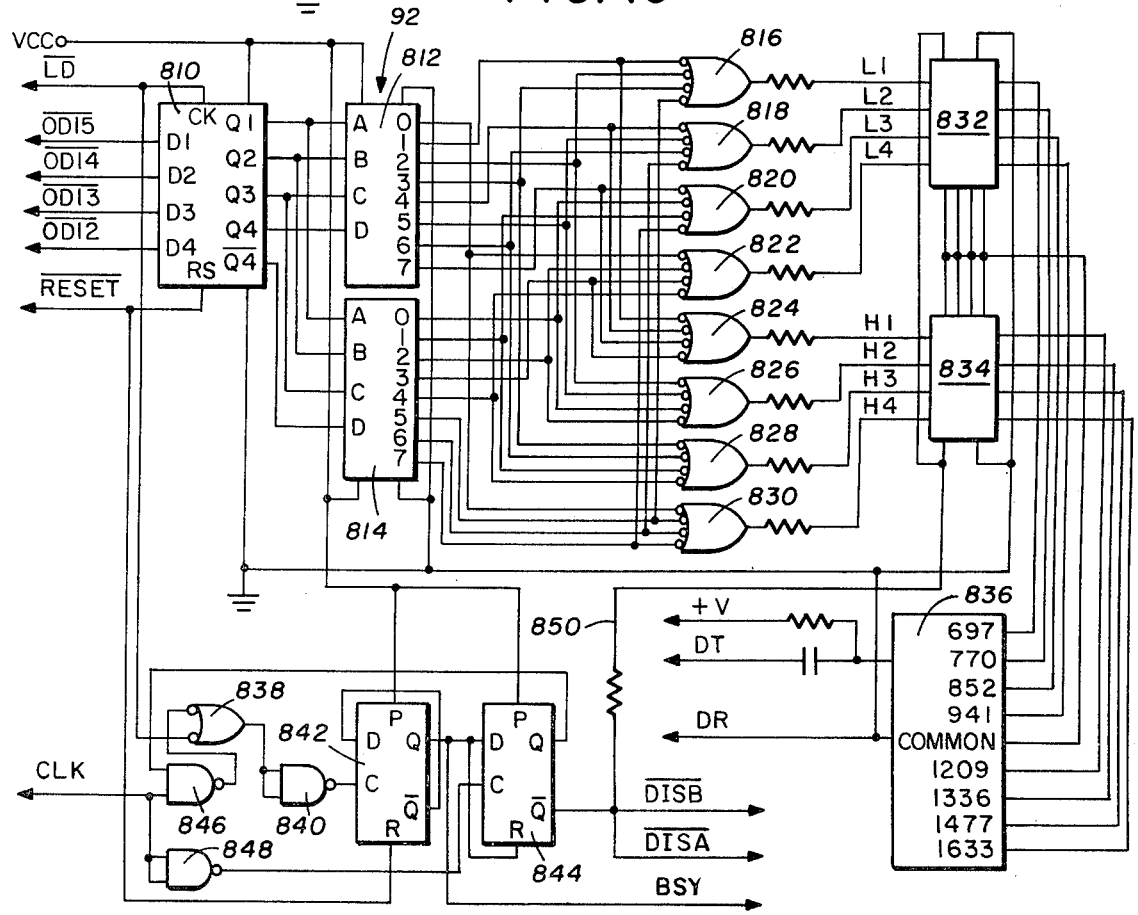
FIG. 20 is a schematic diagram of the tone signal generator.

FIG. 20 illustrates the tone signal generator 92 previously shown in FIG. 3. As previously noted, four tone signal generators 92 will be connected to signal generator base circuitry as shown in FIGS. 16-18. Data signals $\overline{\text{DO12}}$ through $\overline{\text{DO15}}$ from the central processor 36 are routed to the generator base circuitry previously described via the DCM bus. These data signals are inverted to become $\overline{\text{OD12-OD15}}$ and are applied to the latch 810 shown in FIG. 20. The $\overline{\text{LD}}$ signal clocks the latch 810 to thereby apply an output to a decoder comprising decoders 812 and 814 and OR gates 816-830. Gates 816-830 generate signals L1-L4 and H1-H4 for application to amplifying circuits 832 and 834. Amplofying circuits 832 and 834 may comprise, for example, the CA3046 transistor array. The amplified signals from the amplofyers 832 and 834 are applied to a tone generator 836 which may comprise, for example, an MH8913 tone generator. Generator 836 provides two simultaneous frequencies DT and DR which are routed to the signal generator base circuitry previously shown.

The $\overline{\text{LD}}$ signal is also applied to an OR gate 838, the output of which is applied through a NAND gate 840 to a flipflop 842 interconnected with the flipflop 844. The CLK50 millisecond clock pulse is applied to NAND gates 846 and 838 and through a NAND gate 848 to the flipflop 844. The resulting output from flipflops 842 and 844 is $\overline{\text{DISA}}$, which is applied to the amplifiers 832 and 834 via lead 850 in order to disable the amplifiers when no output is present. Signals $\overline{\text{DISB}}$ and $\overline{\text{BSY}}$ are also routed to the signal generator base circuitry previously described. The tone signal generator is thus operable in response to data signals from the central processor 36 to generate desired simultaneous combinations of tone frequencies to simulate dialing tone signals.

DCM TERMINATOR

Figure 21:
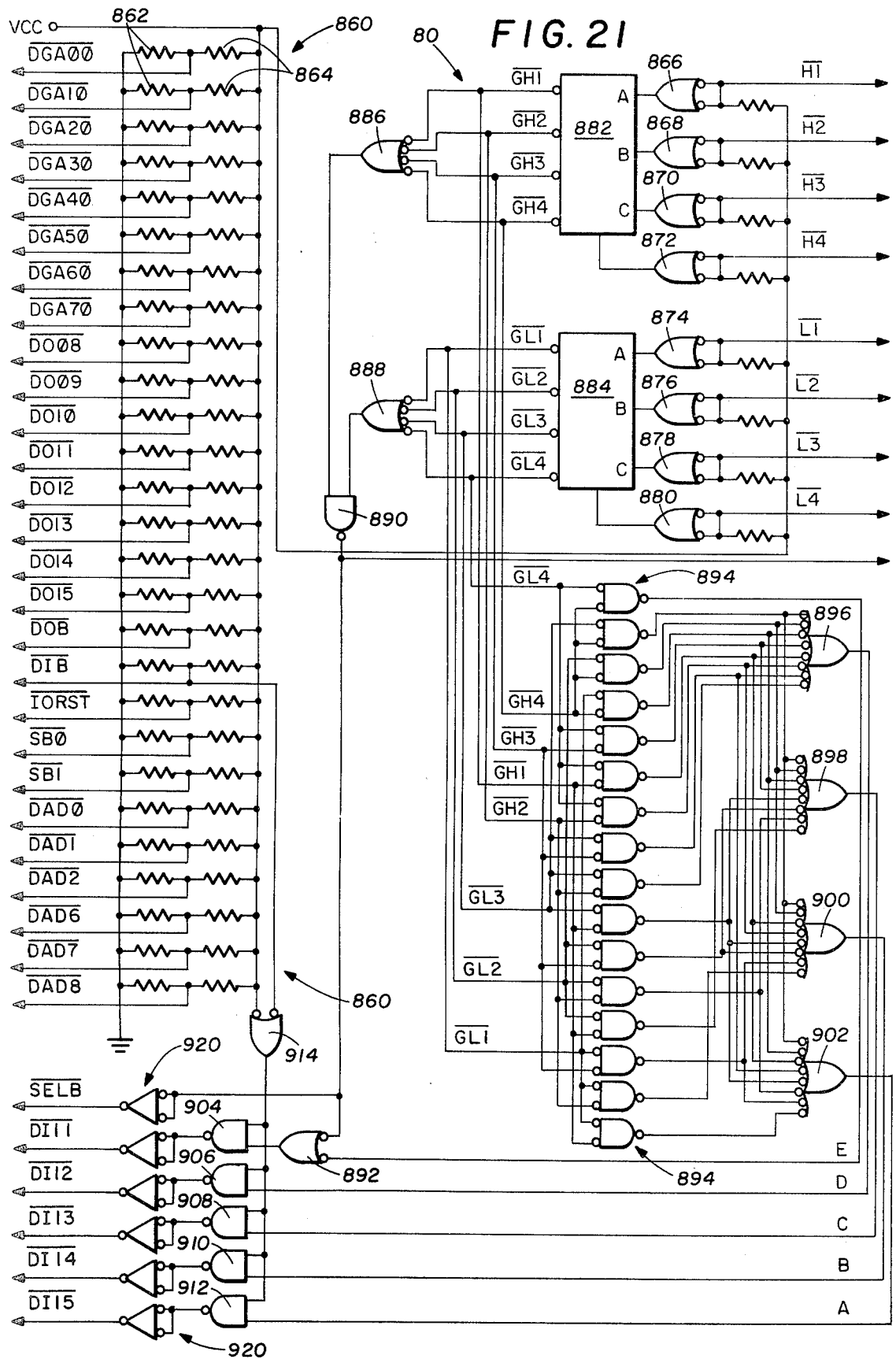
FIGS. 21-22 are schematic diagrams illustrating the DCM bus terminator circuitry.
Figure 22:
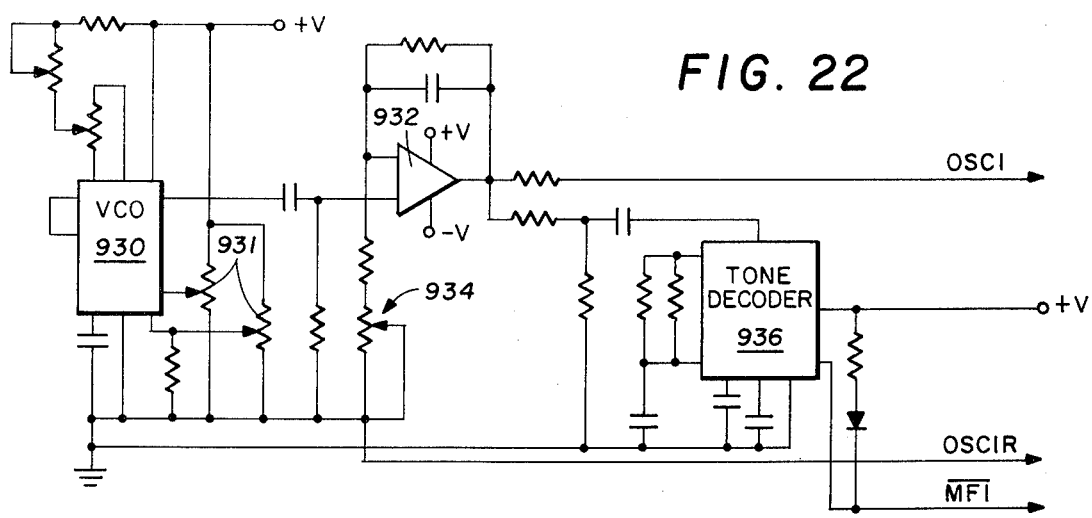

FIGS. 21 and 22 illustrate the DCM bus terminator 80 (FIG. 3) which provides termination of the DCM bus signals, generates oscillator and detector signals, and decodes signals from the tone signal receiver. Termination is provided by a resistor network identified generally by the numeral 860 which comprises a plurality of resistors 862 and 864 connected in parallel. Resistors 864 may, for example, have a magnitude of 330 ohms, wile resistors 864 may have a magnitude of 220 ohms. $\overline{DGA00}$-$\overline{DGA70}$ signals are applied to the resistor network, as are $\overline{DO08}$-$\overline{DO15}$ signals. Similarly, signals $\overline{DOB}$, $\overline{DIB}$, $\overline{IORST}$, $\overline{SB0}$, $\overline{SB1}$, and $\overline{DAD0}$-$\overline{DAD8}$ signals are terminated at the resistor termination network.

Signals $\overline{H1}$-$\overline{H4}$ and $\overline{L1}$-$\overline{L4}$ are applied from the tone signal receiver (previously described) to a decoder circuit comprising OR gate 866–880 and decoders 882 and 884. Two out of eight signals applied to the decoder circuitry are selected from a BCD output by transmitting signals $\overline{GH1}$-$\overline{GH4}$ and $\overline{GL1}$-$\overline{GL4}$ through OR gates 886 and 888 and through a NAND gate 890 into an OR gate 892. The signals $\overline{GH1}$-$\overline{GL4}$ are also applied through sixteen NAND gates 894 and through OR gates 896–902 to inputs of NAND gates 904–912. The $\overline{DIB}$ signal is applied through an OR gate 914 to the remaining inputs of the NAND gate 904–912. The output of OR gate 892 is applied to an input of gate 904. BCD outputs $\overline{DI11}$-$\overline{DI15}$ are applied from the output of gates 904–912 through drivers 920. The BCD output from gates 904–912 thus are a BCD equivalent of tone signals applied from the tone signal receiver. For example, an input of $\overline{H2}$ (1333 Hz) and $\overline{L4}$ (941 Hz) provides a BCD output from signals $\overline{DI11}$-$\overline{DI15}$ of 10, which in binary code is 1010. A complete summary of the decoder input and output is provided below in Table I, wherein pairs of tones represented by L1–L4 and H1–H4 are converted to binary outputs as output signals DI11–DI15.

TABLE I

| 697Hz L1 | 770Hz L2 | 852Hz L3 | 941Hz L4 | 1208Hz H1 | 1333Hz H2 | 1477Hz H3 | 1633Hz H4 | DI 11 | DI 12 | DI 13 | DI 14 | DI 15 |
|---|---|---|---|---|---|---|---|---|---|---|---|---|
|  |  |  | X |  |  |  | X | 1 | 0 | 0 | 0 | 0 |
| X |  |  |  |  | X |  |  | 1 | 0 | 0 | 0 | 1 |
| X |  |  |  |  |  | X |  | 1 | 0 | 0 | 1 | 0 |
| X |  |  |  |  |  |  | X | 1 | 0 | 0 | 1 | 1 |
|  | X |  |  | X |  |  |  | 1 | 0 | 1 | 0 | 0 |
|  | X |  |  |  | X |  |  | 1 | 0 | 1 | 0 | 1 |
|  | X |  |  |  |  | X |  | 1 | 0 | 1 | 1 | 0 |
|  |  | X |  | X |  |  |  | 1 | 0 | 1 | 1 | 1 |
|  |  | X |  |  | X |  |  | 1 | 1 | 0 | 0 | 0 |
|  |  | X |  |  |  | X |  | 1 | 1 | 0 | 0 | 1 |
|  |  |  | X | X |  |  |  | 1 | 1 | 0 | 1 | 0 |
|  |  |  | X | X |  |  |  | 1 | 1 | 0 | 1 | 1 |
|  |  |  | X |  | X |  |  | 1 | 1 | 1 | 0 | 0 |
| X |  |  |  |  |  |  | X | 1 | 1 | 1 | 0 | 1 |
|  | X |  |  |  |  |  | X | 1 | 1 | 1 | 1 | 0 |
|  |  | X |  |  |  |  | X | 1 | 1 | 1 | 1 | 1 |

The output from NAND gate 90 is also applied through a driver 920 as $\overline{SELB}$.

FIG. 22 illustrates the dial tone oscillator included within the terminator 80 shown in FIG. 3 and FIG. 21. A voltage controlled oscillator 930 generates an output to an operational amplifier 932. The output of the VCO 930 is adjusted to 444 Hz by potentiometer 93. Potentiometer 934 is utilized to adjust the signal amplitude output from the amplifier 932. The operational amplifier 932 is utilized as a voltage follower and provides an output OCS1 which is routed to the dial tone generator and to a tone decoder 936. Decoder 936 detecte the 444 Hz signal from the oscillator and generates a locig "O" at signal $\overline{MFI}$ which is routed to the dial tone generator.

THE SWITCH MATRIX

Figure 23:
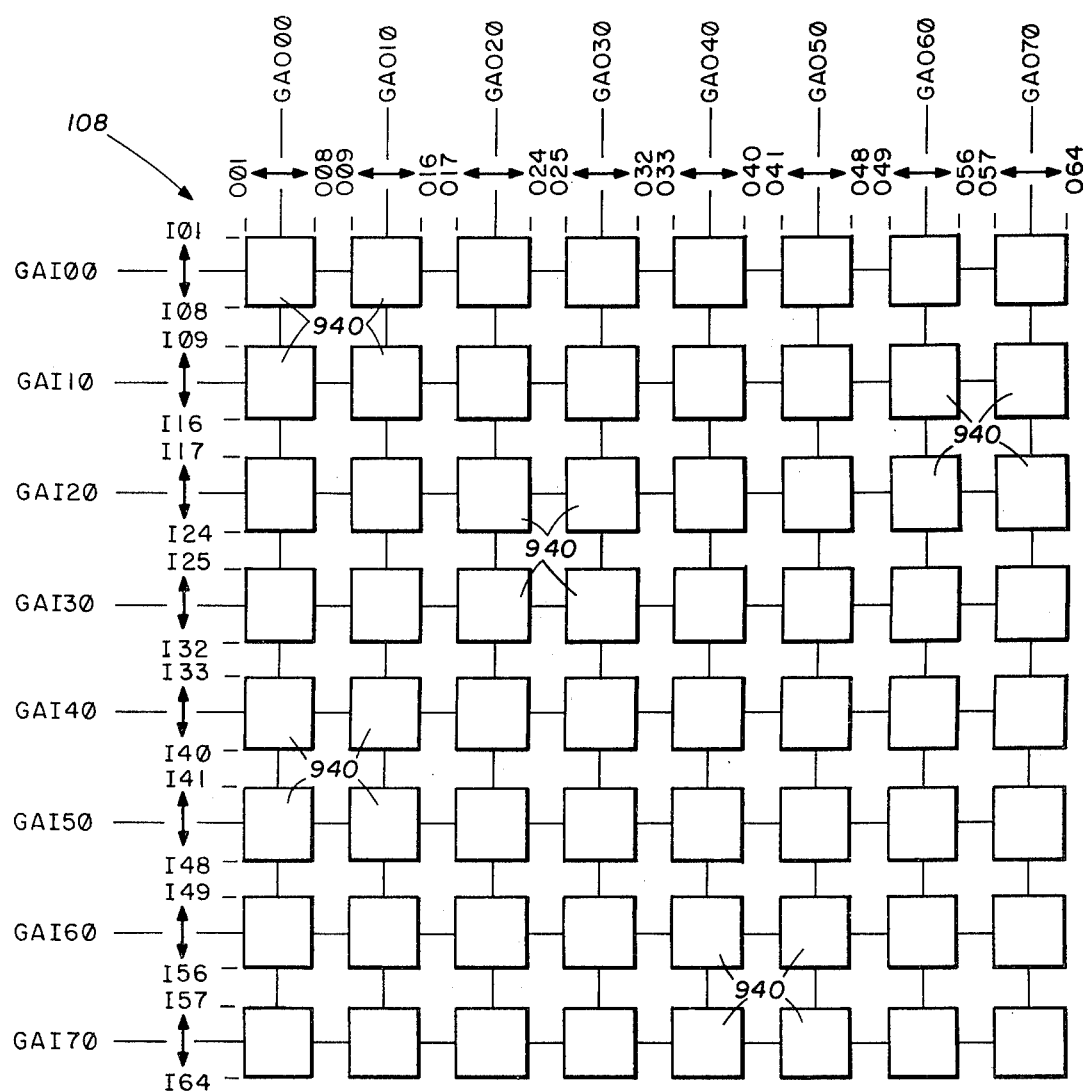
FIG. 23 is a block diagram of the switch matrix of the invention.

FIG. 23 illustrates in block diagram form the entire switch matrix 108 previously shown in FIG. 3. As shown in FIG. 23, the switch matrix comprises 64 8 × 8 switch matrices 940 interconnected in a generally rectangular configuration. 64 input signals I01-I64 are applied to the input of the switch matrix, while sixty-four output signals O01-O64 are applied to the output side of the switch matrix as shown in FIG. 23. In addition, eight input addressing signals GAI00-GAI70 are applied to the input side of the switch matrix, wile eight output address signals GAO00-GAO70 are applied to the output side of the matrix. By the proper application of the addressing signals, any point within the sixty-four 8 × 8 matrixes may be connected to provide the switching operation previously described somewhat diagrammatically in FIG. 2.

Figure 24:
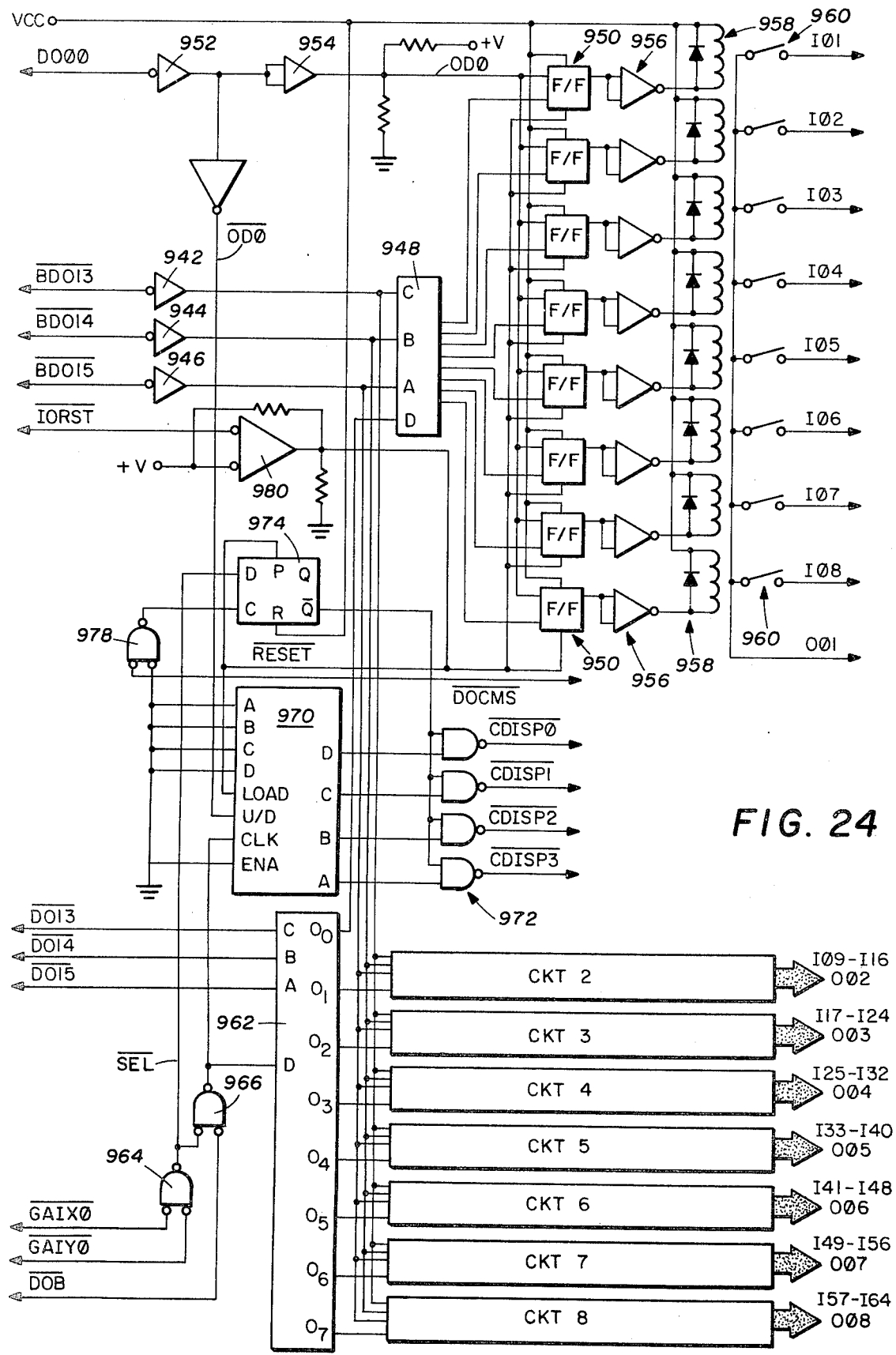
FIG. 24 is a schematic diagram of a portion of the switch matrix.

FIG. 24 illustrates in schematic detail the circuitry equivalent to the 8 × 8 switch matrixes 940 shown in the first vertical row of the matrix of FIG. 23. These eight 8 × 8 matrixes receive 64 input signals I01-I64 and receive eight output signals O01-O08. FIG. 24 thus shows only ⅛ of the total switch matrix as shown in FIG. 23. However, it will be understood that the circuitry shown in FIG. 24 is identical to the remaining seven stages of the switch matrix, with only the output signals changing.

Device address signals $\overline{BDO13}$-$\overline{DBO15}$ are applied through the drivers 942–946 to a decoder 948. Decoder 948 decodes the device address signal to generate signals which are applied to eight flipflops 950. Each flipflop 950 is clocked by applying the signal DO00 through a driver 952 and 954 to supply an OD0 clocking signal. The Q outputs of the eight flipflops 950 are applied through eight driver stages 956 to control eight relay coils 958. Each of the relay coils 958 control one of eight relay switches 960 in order to provide a contact closure between the output terminal O01 and one of the eight input terminals I01-I08.

Data output signals $\overline{DO13}$-$\overline{DO15}$ are applied to a decoder 962 and group address signals GAIZO and GAOYO (the X and Y standing for 0 to 8 as indicated in FIG. 23) are applied to a NAND gate 964. When a $\overline{DOB}$ signal is applied to a NAND gate 966 from a central processor, signals 00 through 07 are clocked from the decoder 962 and are applied to the decoder 948 and are also applied to the seven additional decoders (not shown) found in circuits 2-8. Each of the circuits 2-8 is identical to the schematic circuitry shown in FIG. 24 including decoder 948, flipflops 950, drivers 956 and relay coils 958 and relay contacts 960. The output from gate 966 is also utilized to clock a counter 970 which generates display signals $\overline{CDISP0}$-$\overline{CDISP3}$ through NAND gates 972. The $\overline{SEL}$ signal from the output of gate 964 is applied to a flipflop 974, the Q output of which is applied to gates 972.

The DOCMS signal generated from prior circuitry is applied to an input of a NAND gate 978 in order to clock the flipflop 974. The IORST reset signal is applied through an invertor 980 to apply reset to the circuitry.

As shown in FIG. 24, any one of the eight illustrated circuits may be selected by generation of one of eight GAIX0 and one of eight GAIY0 group address signals. The particular contacts to be closed within the 8 × 8 matrix is then selected by the device address signals BDO13-BDO15 and DO13-DO15. With the use of the present switch matrix, any one of a possible 4096 switch contacts may be made, thereby providing the present system with a large degree of flexibility and adaptability in interconnecting a wide number of incoming telephone trunk lines without outgoing telephone trunk lines in the manner previously described.

BMM AND EMM TERMINATORS

Figure 25:
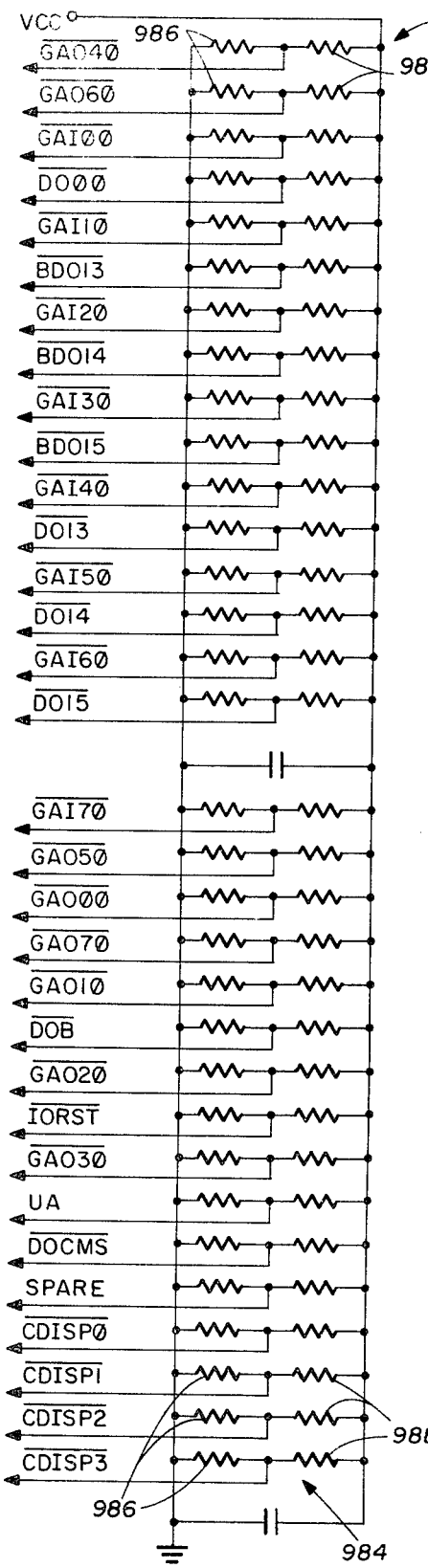
FIG. 25 is a schematic diagram of the BMM and EMM terminator circuits.

FIG. 25 illustrates terminator circuitry for use with both the BMM and EMM terminator circuits 112 and 114 previously shown in FIG. 3. Each of these terminator circuits comprises a network of resistors 984. Each of the resistors 986 are identical and may comprise for example a 330 ohm resistor. Similarly, each of the resistors 988 are identical and may comprise for example a 220 ohm resistor. The terminator circuit 984 provides termination for the signals applied to the BMM and EMM bus line. For example, the $\overline{GAO40}$, $\overline{GAO60}$, $\overline{GAI00}$ and $\overline{DO00}$ are applied to the junctions of pairs of the resistors 986 and 988. In a similar manner, the remaining signals shown in FIG. 25 are applied to the terminator card for proper termination.

Figure 26:
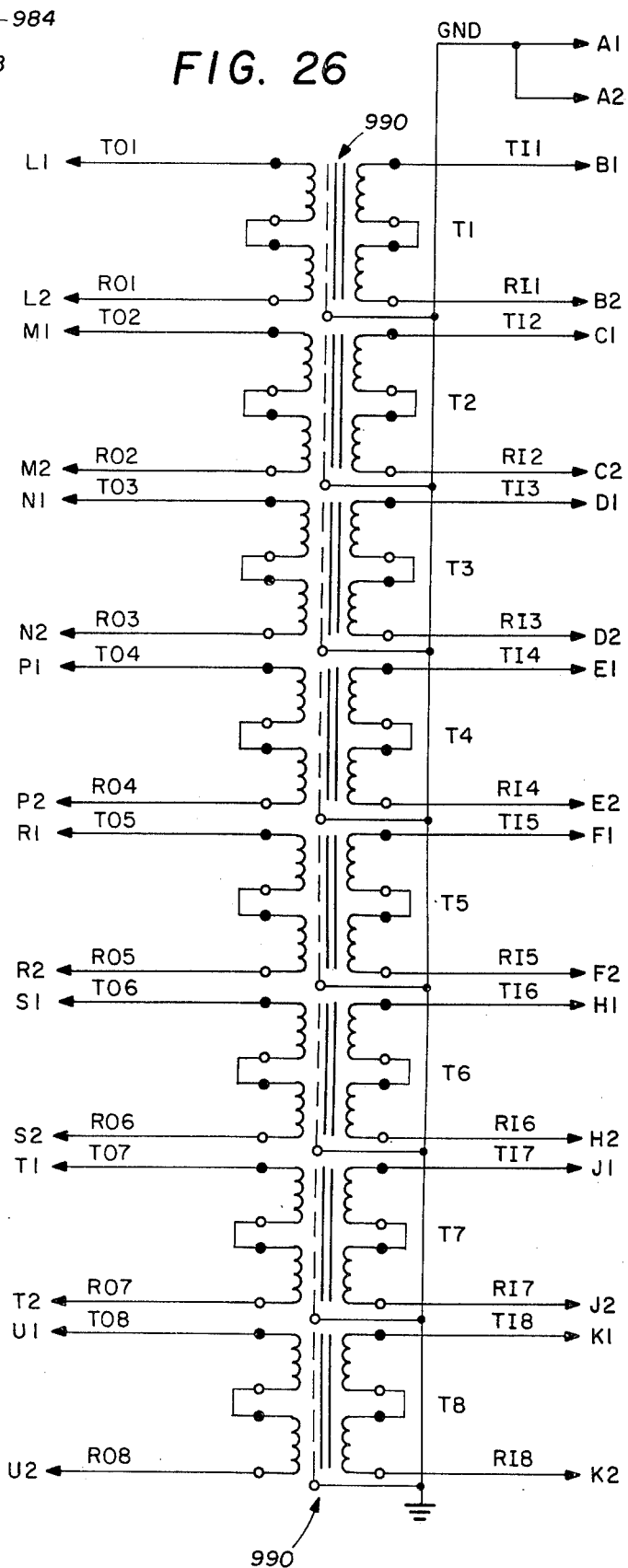
FIG. 26 is a schematic diagram of the IDM audio transformers.

FIG. 26 illustrates in schematic detail the IDM audio transformer utilized to couple signals to and from the IDM display 84 previously shown in FIG. 3. As shown in FIG. 26, eight transformers 990 are connected to receive signal TI1-TI8 and RI1-RI8 and to apply the signals as output signals TO1-8 and RO1-8. The operation of the audio transformers were previously described with respect to the IDM display.

ANNOUNCEMENT UNIT

Figure 27:
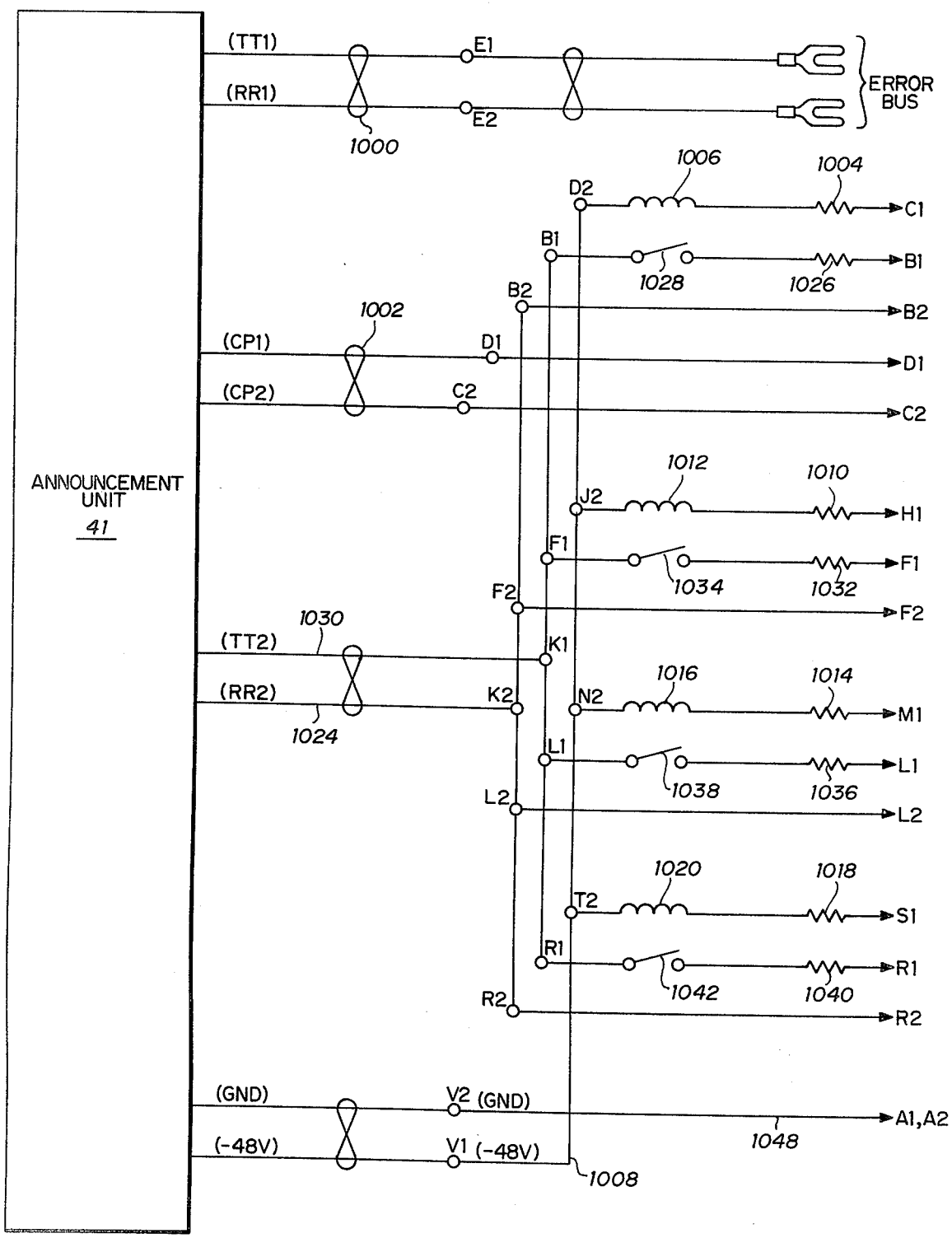
FIG. 27 is a schematic diagram of the announcement unit circuitry used in the short term queuing aspect of the system.

FIG. 27 illustrates in schematic detail the connection of the announcement unit 41 with the VCA control 82 and the switch matrix 20. As previously noted, the announcement unit may comprise for example the Audichron Model J2120I(HQ1) multi-channel recorder-announcer. Unit 41 is connected to provide simultaneous message service to as many as four users. The inputs and outputs of the Audichron unit are identified in the figure in brackets.

The TT1 and RR1 terminals of unit 41 are applied through a cable 1000 for connection to the error bus of the system. The CP1 and CP2 terminals of the announcement unit 41 are applied through a cable 1002 for connection to the D1 and C2 signal terminals. The C1 signal terminal is applied through a resistor 1004 and a relay coil 1006 to a source of negative voltage potential. Similarly, signal terminal H1 is connected through resistor 1010 and relay coil 1012, signal terminal M1 is connected through a resistor 1014 and relay coil 1016, and signal terminal S1 is connected through a resistor 1018 and relay coil 1020 for connection to the lead 1008. Signal terminals D2, F2, L2 and R2 are commonly connected through lead 1024 to the RR2 terminal of the announcement unit 41.

Signal terminal B1 is applied through a resistor 1026 and through the relay switch 1028 to lead 1030 connected to the TT2 terminal of the unit 41. Similarly, signal terminal F1 is connected through a resistor 1032 and a relay switch 1034 to lead 1030 and signal terminal L1 is applied through a resistor 1036 and relay switch 1038 to lead 1030. Signal terminal R1 is applied through a resistor 1040 and relay switch 1042 to lead 1030. Energization of relay coils 1006, 1012, 1016 and 1020 energizes the relay switches 1028, 1034, 1038 and 1042. Signal ground is applied to the unit 41 via lead 1048.

In operation of the system shown in FIG. 27, signals C1, H1, M1 and S1 from the VCA are utilized to select the play back from the announcement unit 41 of a message over any one of signal terminals B1, F1, L1 or R1 in order to allow up to four simultaneous transmissions of the message. As has previously been noted, a prerecorded announcement is placed on the announcement unit 41 to indicate to the caller that all lines are presently busy and to request the caller to hold for a predetermined time interval.

SYSTEM OPERATING PROCEDURES

The automatic send/receive (ASR) teletype set 66 illustrated in FIG. 3 is used as the control console for the system. The idle-line motor control 64 is used to turn the motor on prior to a message print out. The control is turned on automatically by the central processor 36 prior to a message pring out, or manually by the operator, and stays activated for a duration of one minute after the last character is either sent or received.

A control character is entered by the operator by depressing CTRL on the teletype 66 and typing one of the following desired characters:

| CTRL | | | |
|---|---|---|---|
| | Ⓐ | | Attention |
| | Ⓩ | | Command Reset |
| | Ⓣ | | Reads Out Time |
| | Ⓓ | | Reads Out Date |
| | Ⓢ | W | Speed Numbers (reset) |
| | Ⓕ | R | Port Status (reset) |
| | Ⓗ | Y | System Status (reset) |
| | Ⓛ | O | Authorization numbers (reset) |
| | Ⓧ | | Maintenance Use Only |
| | Ⓟ | | Input, Local Paper tape |
| | ← | | Copy, Paper tape |

System reports are provided by the system upon operator request and consist of lists of authorization numbers, speed numbers, and trunk, system, or device status.

To have a complete list of all authorized numbers printed out, the following procedure is followed:
 a. Set idle-line motor control switch to on.
 b. Type CTRLⒶon teletype 66.
 c. (The Teletype 66 responds with *.)
 d. Type CTRLⓁ
 e. (The teletype 66 responds with the time of day, date, current list of numbers, number restrictions, and number of times used.)

EXAMPLE:

14:15:41 10/05/73
List of current authorization numbers

| Authorization No. | Authorization Level Personal Use | Usage |
|---|---|---|
| 4000 | 15P | 15 |
| 4001 | 15P | 4 |
| 4002 | 15P | 1 |
| 4003 | 15P | 3 |
| 4004 | 15P | 0 |
| 4005 | 15P | 2 |
| 4006 | 15P | 0 |
| 4007 | 15P | 0 | f. When a CTRL Ⓐ and CTRL Ⓞ is typed in, the Teletype 66 responds with the same list, except the numbers in the usage column are reset to zero.

To obtain a specific authorization numbers list, the following procedure is followed:
a. Turn on Teletype.
b. Type in CTRL Ⓐ.
c. Type in specific numbers.
d. Type in CTRL Ⓛ.
e. The Teletype responds with the specific authorization number(s), the restriction, and the number of times used.

EXAMPLE:

| *8000 | 8001 | |
| 8000 | 15P | 19 |
| 8001 | 15P | 2 |
| 14:27:40 | 10/05/73 Command Accepted. | | f. When a CTRL Ⓐ and CTRL Ⓞ is typed in, the Teletype responds with the same list, except the numbers in the usage column are reset to zero.

To provide a print out of system status, the following procedure is followed:
a. Turn on Teletype.
b. Type CTRL Ⓐ CTRL Ⓗ.

EXAMPLE:

10/05/73  09:25:57

| Blockages | : | 16 |
| Empty Storage | : | 0 |
| Current Storage | : | 54 |
| Low-Water Mark | : | 44 |
| Power Failures | : | 0 |
| System Flags | : | 000077 |
| Mag Tape Flags | : | 000000 | c. When a CTRL Ⓐ and CTRL Ⓨ is typed in, the Teletype responds with the same list, except the numbers in the usage column are reset to zero.

The system may also be operated to provide a print out of the status of all trunk and device ports. Input ports are identified by numbers less than 1000, output ports by numbers equal or greater than 1000. The trunk caps status is indicated by: I for inactive, D for device connected, and T for Touchtone, the column identified by LINK indicates the connection at the time of the report. A N/C indicates no connection. A 4 in the port column and a 1002 in the LINK column indicates input port 4 connected to output port 1002. C.F. and D.F. indicate connect failure and disconnect failure, of the telephone company central office respectively.

To obtain a status report:
a. Turn on Teletype.
b. Type in CTRL Ⓐ and a CTRL Ⓕ.

EXAMPLE:

10/05/73  14:23:19
Aborted Attempts: 19

| Port | LVL | Status | Link | C.F. | D.F. | Calls | Mins. |
|---|---|---|---|---|---|---|---|
| 1 | 0 | | N/C | 0 | 0 | 114 | 400 |
| 2 | 0 | | N/C | 0 | 0 | 64 | 245 |
| 3 | 0 | | N/C | 0 | 0 | 35 | 146 |
| 4 | 0 | | 1002 | 0 | 0 | 36 | 150 |
| 5 | 1 | 1 | N/C | 0 | 0 | 0 | 0 |
| 6 | 8 | | N/C | 0 | 0 | 27 | 80 |
| 7 | 8 | D | N/C | 0 | 0 | 138 | 0 |
| 8 | 8 | D | N/C | 0 | 0 | 138 | 0 |
| 1001 | 0 | T | N/C | 0 | 0 | 42 | 158 |
| 1002 | 0 | T | 4 | 0 | 0 | 5 | 7 |
| 1003 | 0 | T | N/C | 0 | 0 | 4 | 10 |
| 1004 | 0 | T | N/C | 0 | 0 | 7 | 14 |
| 1005 | 0 | T | N/C | 0 | 0 | 10 | 1 |
| 1006 | 0 | T | N/C | 0 | 0 | 12 | 6 |
| 1007 | 0 | D | N/C | 0 | 0 | 15 | 12 |
| 1008 | 0 | D | N/C | 0 | 0 | 1 | 2 | c. When a CRTL Ⓐ and CTRL Ⓡ is typed in, the Teletype responds with the same list, except the numbers in the usage column are reset to zero.

To provide status and current call information to specific ports:
a. Turn Teletype on.
b. Type CTRL Ⓐ.
c. Type in specific port numbers.
d. Type in CNTL Ⓕ.

EXAMPLE:

| 1 | 1006 | 7 | | | | | |
| | 1 | 0 | | N/C | 0 | 0 | 114 | 400 |
| | 1006 | 15 | T | N/C | 0 | 0 | 34 | 16 |
| | 7 | 8 | D | N/C | 0 | 0 | 138 | 0 |
| 14:19:09 | 10/05/73 | Command accepted. | | | | | |

To obtain a report including a list of current universal speed numbers:
a. Turn Teletype on.
b. Type in CTRL Ⓐ and a CTRL Ⓢ.

EXAMPLE:

14:28:59  10/05/73
List of Current Universal Speed Numbers

| Universal Speed No. | Phone Number | Usage |
|---|---|---|
| 300 | 2334496 | 1 |
| 301 | 1 215 2656700 | 2 |
| 302 | 1 408 7321650 | 0 |
| 303 | 1 203 8537400 | 2 |
| 304 | 1 203 7625521 | 0 |
| 400 | 1 414 4532033 | 0 |
| 401 | 1 312 8288023 | 0 | c. When a CTRL A and CRTL W is typed in, the numbers in the usage column are reset to zero.

To obtain a list of all Speed Numbers:
a. Turn Teletype on.
b. Type in CTRL Ⓐ.
c. Type ALL
d. Type CTRL Ⓢ.

The Teletype responds with a list of all Speed Numbers used in the system.

To obtain a report on the time and date:
a. Turn Teletype on.
b. Type in CTRL Ⓐ and CTRL Ⓣ.
c. The Teletype responds with current time-of-day.

EXAMPLE:

The Time is 14:35:47.
d. Type in CTRL Ⓐ and CTRL Ⓓ.
e. The Teletype responds with current date.

EXAMPLE:

The date is 10/05/73.

The system commands are used to add or delete trunk lines, devices, personal or universal speed numbers, and authorization numbers and to activate or deactivate trunk lines.

To add speed numbers:
a. Attendant types in Ⓐ ADD UNIV 54 – 55↓
b. System prints out 54 - Please Enter Associated Telephone Number 1 212 5551212
c. Attendant 54 1 212 5551212

To delete a speed number, user types in "DELETE SPEED 54 Return", or the like.

To change an authorization number:

| | |
|---|---|
| a. Attendant | Ⓐ ADD AUTH 5033 |
| b. System | 5033 — Please Enter Maximum Level (0–15) |
| c. Attendant | 15↓ |
| d. System | Is it WATS — Restricted? ("Y" or "N"). |
| e. Attendant | N↓ |
| f. System | Is it TIME — Restricted?("Y" or "N"). |
| g. Attendant | N↓ |
| h. System | 5033 15 Accepted. (Time)(Date)(Command Accepted) |
| i. Attendant | Ⓐ DELETE AUTH 4986↓ |
| j. System | 4986  15 — Deleted or 4986 Rejected — Not in Table. (Time)(Date)(Command Rejected). |

Magnetic Tape commands are used to control the tape transport and flag transport malfunction. An example of Magnetic Tape commands is as follows:
a. CTRL Ⓐ TAPE ON RETURN This command writes log records on the magnetic tape. FLAG=000001.
b. CTRL Ⓐ TAPE OFF RETURN This command suspends logging, tape status at start of program. Flag=000000.
c. CTRL Ⓐ TAPE END RETURN This command rewinds the tape and puts transport in idle status. Tape-mark (EDF) is written. Flag=000002. Idle flag-177777.
d. CTRL Ⓐ TAPE BROKEN This command sends log records to the teletype. Flag=000003.
e. CTRL Ⓐ TAPE FIXED Command same as TAPE OFF.

The present invention may be processed on a Data General 1200 Nova digital computer, along with the associated hardware shown in FIGS. 1–27. A suitable computer language for the invention is Data General Assembly Language. For a more specific description of the Nova 1200 computer and Data General Assembly Language, reference is made to "How to Use the Nova Computers", printed October, 1972 by the Data General Corporation.

Whereas the present invention has been described with respect to specific embodiments thereof, it will be understood that various changes and mofifications will be suggested to one skilled in the art, and it is intended to encompass such changes and modifications as fall within the scope of the appended claims.

What is claimed is:

1. A system for automatically controlling the connection of telephone calls between a user's dedicated telephone switching facility having a plurality of user terminals and a plurality of flat rate output telephone lines extending to a central office comprising:
   means for receiving user authorization code numbers from said user terminals,
   means for generating a tone signal only if said authorization code numbers meet a predetermined criterion,
   means responsive to dialing signals from the authorized user terminals for selecting the most economical available one of said flat rate output telephone lines in accordance with a predetermined ranking of said flat rate telephone lines according to economy of use,
   means for connecting, when flat rate output telephone lines are available, the authorized user terminals with the selected flat rate output telephone lines extending to said central office for completion of the dialed telephone calls, and
   means for generating an audio message to the caller when no flat rate output telephone lines are available, said audio message requesting the caller to hold for a predetermined time interval during which the call is automatically connected if a flat rate output telephone line becomes available.

2. The system of claim 1 and further comprising:
   means responsive to predetermined ones of said user authorization codes for immediately connecting the caller with a variable rate output telephone line if no flat rate output telephone lines are available.

3. The system of claim 2 wherein said flat rate telephone lines comprise WATS lines and wherein said variable rate telephone lines comprise direct dial lines.

4. The system of claim 2 and further comprising:
   means for connecting the caller with a variable rate output telephone line if said predetermined time interval expires without a flat rate output telephone line becoming available 5. The system of claim 4 and further comprising:
   means responsive to ones of said user authorization codes having predetermined codings for terminating the call upon the expiration of said predetermined time interval even if a variable rate telephone line is available.

6. The system of claim 4 and further comprising:
   means for generating a warning tone prior to the completion of a call on a variable rate telephone line to enable the caller to terminate the call if desired.

7. A system for automatically controlling the interconnection of inter-city telephone calls between a plurality of input telephone lines and a plurality of output telephone lines extending to a central office comprising:
   a switch matrix having a plurality of switches for selectively connecting a plurality of paths between matrix inputs and matrix outputs,
   a progress information generator connected to said matrix,
   means connected for detecting a service request generated on one of said input telephone lines,
   matrix control means responsive to said detecting means for controlling said matrix to connect said progress information generator to said input telephone line requesting service,
   a dial tones generator connected to said matrix, means responsive to dialing signals applied on said input telephone line for selecting one of said output telephone lines, means for operating said matrix to connect said dial tones generator to an available selected output telephone line such that representations of said dialing signals are transmitted from said dial tones generator to the central office in order to establish connections with the dialed location, means for operating said matrix when output telephone lines are available to disconnect said progress information generator and said dial tones generator from said telephone lines and to connect said input telephone line to said selected output telephone line for completion of the dialed inter-city telephone call, means for requesting a caller to hold for a predetermined time interval when no output telephone lines are available, and means responsive to the availability of an output telephone line during said predetermined time interval for operating said matrix to connect said dial tones generator to the available output telephone line to complete the call.

8. The system of claim 7 and further comprising:
means responsive to a high priority authorization user code input by a caller to override said requesting means and to complete a call via direct dial output telephone lines.

9. The system of claim 7 wherein said output telephone lines comprise flat rate WATS lines.

10. The system of claim 7 and further comprising:
means for connecting the caller with a variable rate output telephone line if said predetermined time interval expires without a flat rate output telephone line becoming available.

11. The system of claim 7 and further comprising:
means for generating a warning tone prior to the completion of a call on a variable rate telephone line to enable the caller to terminate the call if desired.

12. A method of controlling the connection of inter-city telephone calls between a plurality of input telephone lines at a user's facility and a plurality of leased output telephone lines extending to a central office comprising:
receiving a service request signal from the user's facility on one of said input telephone lines,
detecting dialing signals from the input telephone line,
selecting the most economical one of said leased output telephone lines for completing the dialed call in accordance with a predetermined ranking of said telephone lines according to economy of use and establishing a voice connection through said input telephone line through the selected leased output telephone line,
if no leased output telephone lines are available, generating an audio message to the caller via the input telephone lines requesting the caller to hold for a predetermined time interval,
if a leased output telephone line becomes available during the predetermined time interval, transmitting representations of the received dialing signals to the available leased output telephone line to establish connection with the desired called location through the central office, and operating a switch matrix to connect the calling input telephone line with the available output telephone line.

13. The method of claim 12 wherein direct dial telephone lines and said output telephone lines are connected to the switch matrix and further comprising:
connecting a call to a direct dial telephone line if said predetermined time interval expires without one of said output telephone lines becoming available.

14. The method of claim 12 wherein direct dial telephone lines and said output telephone lines are connected to the switch matrix and further comprising:
responding to the reception of a high priority user authorization code in said dialing signals for immediately connecting the call through a direct dial telephone line if none of said output telephone lines are available at the time of the call.

15. The method of claim 12 wherein variable rate telephone lines and said output telephone lines are connected to the switch matrix and further comprising:
means responsive to first predetermined ones of said user authorization codes for automatically establishing connection with the called location through an available variable rate telephone line upon expiration of said predetermined time interval, and
means responsive to second predetermined ones of said user authorization codes for terminating the dialed call upon the expiration of said predetermined time interval even if a variable rate telephone line is available.

16. The method of claim 12 wherein variable rate telephone lines and said output telephone lines are connected to the switch matrix and further comprising:
means for establishing connection with the called location through an available variable rate telephone line upon expiration of said predetermined time interval, and
means for generating a warning tone prior to the completion of a call on a variable rate telephone line to enable the caller to terminate the call if desired.

17. A system for automatically controlling the connection of inter-city telephone calls at a user's branch exchange between a plurality of input telephone lines and a plurality of leased long distance telephone lines extending to various area zones through a central office comprising:
input and output voice connecting arrangements disposed between the user's branch exchange and a central office and connected to said telephone lines,
circuitry connected to said input voice connecting arrangements for receiving dialing signals from said user's branch exchange,
a switching matrix connected between said voice connecting arrangements,
an automatic digital processing machine connected to said circuitry for receiving said dialing signals and in response thereto selecting the most economical available one of said long distance telephone lines for completing each dialed call in accordance with a predetermined ranking of said long distance telephone lines according to economy of use, said processing machine then operating said switching matrix to establish audio connections through said voice connecting arrangements between the calling input telephone lines and the selected most economical long distance telephone lines, and means for generating an audio message to the caller when no leased telephone lines are available, said audio message requesting the caller to hold for a predetermined time during which the call is automatically connected if a leased telephone line becomes available.

* * * * *